United States Patent
Zhou et al.

(10) Patent No.: US 11,882,357 B2
(45) Date of Patent: Jan. 23, 2024

(54) IMAGE DISPLAY METHOD AND DEVICE

(71) Applicant: HUAWEI TECHNOLOGIES CO., LTD., Guangdong (CN)

(72) Inventors: Chengtao Zhou, Hangzhou (CN); Qianwen Zhu, Hangzhou (CN); Yinting Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/484,061

(22) Filed: Sep. 24, 2021

(65) Prior Publication Data
US 2022/0014684 A1 Jan. 13, 2022

Related U.S. Application Data

(63) Continuation of application No. PCT/CN2020/079620, filed on Mar. 17, 2020.

(30) Foreign Application Priority Data

Mar. 25, 2019 (CN) .......................... 201910229696.8

(51) Int. Cl.
*H04N 23/63* (2023.01)
*H04N 23/76* (2023.01)

(52) U.S. Cl.
CPC ......... *H04N 23/633* (2023.01); *H04N 23/632* (2023.01); *H04N 23/76* (2023.01)

(58) Field of Classification Search
CPC .... H04N 23/633; H04N 23/632; H04N 23/76; H04N 23/64; H04N 23/667;
(Continued)

(56) References Cited

U.S. PATENT DOCUMENTS 11,517,197 B2 * 12/2022 Zhou ................... A61B 5/0035
2003/0011693 A1 * 1/2003 Oda ..................... H04N 25/616
348/E5.045
(Continued)

FOREIGN PATENT DOCUMENTS

CN 101976455 A 2/2011
CN 102572450 A 7/2012
(Continued)

OTHER PUBLICATIONS

Ben MildenHall (Burst Denoising with Kernel Prediction Networks) (Year: 2018).*
(Continued)

*Primary Examiner* — Yogesh K Aggarwal

(57) ABSTRACT

An image display method and device are provided. The method is applied to an electronic device having a display screen and a camera. The method includes: detecting a first operation of turning on the camera by a user; displaying a photographing interface on the display screen in response to the first operation, where the photographing interface includes a viewfinder frame including a first image; detecting a second operation of the camera indicated by the user; and displaying a second image in the viewfinder frame in response to the second operation, where the second image is an image obtained by processing N frames of raw images captured by the camera; a neural network model is applied to a processing process, and the neural network model uses an image whose noise is lower than a target threshold as an output objective; and N is an integer greater than or equal to 2.

24 Claims, 20 Drawing Sheets

(58) Field of Classification Search
CPC ...... H04N 23/741; H04N 23/80; H04N 23/81;
H04N 23/88; H04N 23/63; H04N 23/62;
G06T 2207/10024; G06T 2207/20016;
G06T 2207/20081; G06T 2207/20084;
G06T 2207/20221; G06T 5/008; G06T
5/50; G06T 5/002; G06T 7/38
See application file for complete search history.

(56) References Cited

U.S. PATENT DOCUMENTS

| | | | |
|---|---|---|---|
| 2005/0047672 A1 | 3/2005 | Ben-Ezra et al. | |
| 2010/0246940 A1 | 9/2010 | Lin | |
| 2011/0058050 A1* | 3/2011 | Lasang ................. | H04N 5/144 |
| | | | 348/208.4 |
| 2015/0348242 A1 | 12/2015 | Molgaard et al. | |
| 2018/0359416 A1 | 12/2018 | Hold-Geoffroy et al. | |

FOREIGN PATENT DOCUMENTS

| | | |
|---|---|---|
| CN | 105141849 A | 12/2015 |
| CN | 107123089 A | 9/2017 |
| CN | 107690804 A | 2/2018 |
| CN | 108391035 A | 8/2018 |
| CN | 108391060 A | 8/2018 |
| CN | 109089053 A | 12/2018 |
| CN | 109120937 A | 1/2019 |
| CN | 109146824 A | 1/2019 |
| CN | 109462732 A | 3/2019 |
| JP | 4421793 B2 | 2/2010 |
| KR | 20180095059 A | 8/2018 |
| WO | 2017215767 A1 | 12/2017 |

OTHER PUBLICATIONS

Ben Mildenhall et al.,"Burst Denoising with Kernel Prediction Networks",Sep. 29, 2018,total: 10pages.
Samuel W. Hasinoff et al.,"Burst photography for high dynamic range and low-light imaging on mobile cameras",Nov. 2016, total:12pages.
Clement Godard et al.,"Deep Burst Denoising",total:18pages, (No Date).
Chen Chen et al., "Learning to See in the Dark", 2018 IEEE/CVF Conference on Computer Vision and Pattern Recognition,total:10pages.
European Search Report for Application No. 20777696.4, dated Mar. 22, 2022, 12 pages.
Chinese Office Action for Application No. 201910229686.8 dated Jan. 26, 2021, 9 pages.
PCT document for PCT/CN2020/079620 dated Mar. 17, 2020, 10 pages.
Indian Office Action for Application No. 202117046905 dated Mar. 28, 2022, 8 pages.
Chinese Office Action for Application No. 202210870947 dated Feb. 3, 2023, 14 pages.
Korean Notice of Allowance for Application No. 10-2021-7034592 dated May 29, 2023, 5 pages.

* cited by examiner

FIG. 11

IMAGE DISPLAY METHOD AND DEVICE

CROSS-REFERENCE TO RELATED APPLICATIONS

This application is a continuation of International Application No. PCT/CN2020/079620, filed on Mar. 17, 2020, which claims priority to Chinese Patent Application No. 201910229696.8, filed on Mar. 25, 2019. The disclosures of the aforementioned applications are hereby incorporated by reference in their entireties.

TECHNICAL FIELD

This application relates to the image processing field, and in particular, to an image display method and device.

BACKGROUND

Currently, as smart terminal technologies develop, terminal devices are becoming more widespread. With increasingly enhanced processing capabilities of the terminal devices and development of camera technologies, people impose a higher demand on photographing quality of the terminal devices. Currently, the terminal devices can obtain better image quality in a scenario with illumination 0.3 lux or higher, for example, in the daytime.

However, in a low-illumination scenario, for example, in a scenario with illuminance 0.3 lux or less, photosensitivity of cameras of the terminal devices is poor due to factors such as a small size of a camera sensor and a small aperture. As a result, noise is introduced into photographed images, and the images are blurred and unclear. Therefore, how to improve an image denoising effect in a very low illumination scenario becomes an urgent problem to be resolved.

SUMMARY

This application provides an image display method and device, to improve an image denoising effect in a low-illumination environment.

According to a first aspect, a technical solution provides an image display method. The method is applied to an electronic device having a display screen (for example, a touchscreen, a flexible screen, and a curved screen) and a camera. The method includes: detecting a first operation of turning on the camera function by a user; displaying a photographing interface on the display screen in response to the first operation, where the photographing interface includes a viewfinder frame, and the viewfinder frame includes a first image; detecting a second operation of the camera function indicated by the user; and displaying a second image in the viewfinder frame in response to the second operation, where the second image is an image obtained by processing N frames of raw images captured by the camera; a neural network model (also referred to as a neural network for short) is applied to a processing process, and the neural network model uses an image whose noise is lower than a target threshold as an output objective; and N is an integer greater than or equal to 2.

In this application, the first operation of turning on the camera by the user is detected, the second operation of indicating the camera by the user is detected, and the second image is displayed in the viewfinder frame of the display screen in response to the second operation, where the second image is the image obtained by processing the N frames of raw images captured by the camera. Because the raw image is an image that is not processed by an ISP or according to an algorithm of an accelerator, a form of noise in the raw image is not damaged. In this application, denoising processing is performed by obtaining the N frames of raw images, to improve an image denoising effect in a low-illumination environment.

Optionally, in an example implementation, the second image is a YUV image output by the neural network model.

Optionally, in another example implementation, the second image is a YUV image, and the YUV image is a YUV image obtained by post-processing a raw image output by the neural network model.

Optionally, in another example implementation, the second image is a raw image output by the neural network model. In this application, the N frames of raw images are images captured by the camera. For example, the camera is a module including a sensor and a lens. The N frames of raw images may be raw images generated by the sensor, raw images that are not accelerated according to the algorithm by the accelerator, for example, a neural network processing unit (neural-network processing unit, NPU), a graphics processing unit (graphics processing unit, GPU), a digital signal processor (digital signal processor, DSP), or another processor, and raw images that are not processed by an image signal processor (image signal processor, ISP). Therefore, an original form of the noise in the raw image is not damaged by processing of the algorithm. In other words, the noise in the raw image is closest to a scenario in which actual noise is introduced into the electronic device used by the user.

It should be noted that the raw image is different from the YUV image. The raw image is raw data obtained by converting a captured light source signal into a digital signal by the sensor. The YUV image is an image obtained by post-processing a raw image, where the post-processing may convert the raw image into the YUV image, for example, through processing by the accelerator and the ISP.

It should be understood that the neural network may be a pretrained or preconfigured neural network. Training data of the neural network may include a raw image and a noise image obtained after noise is added to the raw image. The raw image may be an image with little noise, for example, may be a raw image whose noise is lower than the target threshold.

For example, in an example implementation, the neural network model uses the raw image whose noise is lower than the target threshold as the output objective.

It should be noted that in this application, the electronic device has the display screen. The display screen may be a touchscreen, a flexible screen, a curved screen, or a screen in another form. The display screen of the electronic device has a function of displaying an image. A specific material and a shape of the display screen are not limited in this application.

It should be further understood that the first image is a preview image in a very low-illumination scenario. For example, the first image may be a preview image of a night scenario, and more specifically, may be a preview image in a scenario with illumination less than 0.3 lux. The first image and the second image have same or substantially same display content. Image quality of the second image is better than that of the first image. For example, a color, luminance, a detail, and noise in the second image are better than those in the first image.

In this application, the electronic device obtains the raw image and performs denoising processing on the raw image. The raw image is not processed by the ISP or according to the algorithm of the accelerator. Therefore, the form of the noise is not damaged, and this improves the image denoising effect in the low-illumination environment.

With reference to the first aspect, in some implementations of the first aspect, the second operation of indicating the first processing mode by the user is detected.

For example, the first processing mode may be a professional shooting mode, a night shooting mode, or another mode. For example, the second operation of selecting the professional shooting mode or the night shooting mode by the user may be detected. In response to the second operation of selecting the professional shooting mode or the night shooting mode by the user, the electronic device configures a photosensitivity ISO value of the sensor to be within a target range, for example, sets the ISO value of the sensor of the electronic device to be greater than 12800.

With reference to the first aspect, in some implementations of the first aspect, the second operation of indicating to photograph by the user is detected, where the second operation is an operation used to indicate to photograph in a low-illumination environment.

For example, when the electronic device invokes the sensor and detects the low-illumination scenario, for example, a scenario with illumination less than 0.3 lux, the second operation may be indicating to photograph by the user. The second operation of indicating to photograph may be pressing a photographing button in the electronic device by the user, may be indicating, through voice, the electronic device to photograph by the user, or may further include another action of indicating the electronic device to photograph by the user.

Further, when the electronic device invokes the sensor and detects that the electronic device is currently in the scenario with illumination less than 0.3 lux, the electronic device may configure the photosensitivity ISO value of the sensor to be within the target range.

For example, the target range may be that the ISO value is greater than 6400, or the ISO value is greater than 12800. This application is not limited thereto.

In an example implementation, the N frames of raw images include a reference frame image and m frames of to-be-processed images. The processing process includes: performing registration processing on the m frames of to-be-processed images based on the reference frame image, to obtain m frames of registered images; and obtaining, based on an image set and the neural network model, a denoised output image, where the image set includes the m frames of registered images and the reference frame image, and the output image is the second image.

To be specific, in an example implementation, the output image output by the neural network model is the second image, in other words, the image output by the neural network may be the YUV image. The YUV image is displayed in the viewfinder frame of the display screen.

In an example implementation, the N frames of raw images include a reference frame image and m frames of to-be-processed images. The processing process includes: performing registration processing on the m frames of to-be-processed images based on the reference frame image, to obtain m frames of registered images; and obtaining, based on an image set and the neural network model, a denoised output image, where the image set includes the m frames of registered images and the reference frame image, and the second image is a post-processed output image.

To be specific, in an example implementation, the output image output by the neural network model is the raw image, and the raw image is post-processed. For example, the output raw image is processed by the accelerator and the ISP to obtain the YUV image, and the YUV image is displayed in the viewfinder frame of the display screen.

In an example implementation, the N frames of raw images are obtained, where the N frames of raw images include a reference frame image and m frames of to-be-processed images, N is an integer greater than or equal to 2, and m is a positive integer less than N. Registration processing is performed on the m frames of to-be-processed images based on the reference frame image, to obtain m frames of registered images. A denoised output image is obtained based on an image set and the neural network model, where the image set includes the m frames of registered images and the reference frame image, and the neural network model uses an image whose noise is lower than the target threshold as the output objective.

In this application, the N frames of raw images may be obtained, and registration processing may be performed on the m frames of to-be-processed images in the N frames of raw images based on the reference frame image, to obtain the m frames of registered images. The denoised output image may be obtained based on the image set and the neural network model, where the image set includes the m frames of registered images and the reference frame image, and the neural network uses the image whose noise model is lower than the target threshold as the output objective. In this application, because the raw image is an image that is not processed by the ISP or according to the algorithm of the accelerator, the form of noise in the raw image is not damaged. In this application, denoising processing is performed by obtaining the N frames of raw images, to improve an image denoising effect in a low-illumination environment.

In an example implementation, the N frames of raw images are obtained, and the reference frame image and the m frames of to-be-processed images in the N frames of raw images are determined based on a contrast of the N frames of raw images. The reference frame image may be an image with better image quality in the obtained N frames of images, for example, may be a clear image in the N frames of raw images.

In an example implementation, the performing registration processing on the m frames of to-be-processed images based on the reference frame image, to obtain m frames of registered images includes: performing registration processing on each of the m frames of to-be-processed images based on the reference frame image by using an optical flow method, to obtain the m frames of registered images.

With reference to the first aspect, in some implementations of the first aspect, the obtaining, based on an image set and the neural network model, a denoised output image includes: separating color channels in each frame of image in the image set to obtain a channel image corresponding to each frame of image, where the image set includes the m frames of registered images and the reference frame image, and the channel image includes a first channel image, a second channel image, and a third channel image; processing, by using the neural network model, a channel image set corresponding to the image set, to obtain associated data, where the associated data includes one or more of associated information between images, associated information between different channels in an image, and associated information between channels in different images; obtaining a target channel image of each frame of image based on the associated data, where the target channel image includes a noise image of a first channel, a noise image of a second channel, and a noise image of a third channel; and combining channels in the target channel image to obtain the denoised output image.

It should be understood that the denoised output image may be the raw image.

In an example implementation, the image set is preprocessed to obtain the channel image corresponding to each frame of image. A preprocessing process includes: separating color channels, where the image set includes the m frames of registered images and the reference frame image, and the channel image includes the first channel image, the second channel image, and the third channel image; inputting the channel image corresponding to each frame of image in the image set to the neural network model as input data, to obtain the target channel image as output data of the neural network model, where the target channel image includes the noise image of the first channel, the noise image of the second channel, and the noise image of the third channel; and post-processing the target channel image to obtain the denoised output image, where the post-processing includes channel combination processing, DRC processing, AWB processing, and ISP processing.

It should be understood that, in an example design, either or both of the preprocessing and post-processing processes may be performed in the neural network model. Alternatively, in another example implementation, either of the preprocessing and post-processing processes may not be performed in the neural network model. This is not limited in this application.

Optionally, when the post-processing process is performed in the neural network model, the image output by the neural network may be the YUV image.

Optionally, when the post-processing process is not performed in the neural network model, the image output by the neural network may be the raw image.

It should be understood that the noise image is a noise image estimated by using the neural network model. In other words, the noise image may be an estimated noise image, namely, a noise estimation image, obtained through processing by the neural network.

In an example implementation, obtaining, based on the m frames of registered images, the reference frame image, and the neural network, the denoised output image includes: separating color channels in each frame of image in the image set to obtain a channel image corresponding to each frame of image, where the channel image includes a first channel image, a second channel image, and a third channel image; using the channel image as input data and using the neural network model to obtain a target channel image of each frame of image, where the target channel image includes a noise estimated image of a first channel, a noise estimated image of a second channel, and a noise estimated image of a third channel; and combining channels in the target channel image to obtain the denoised output image.

In this application, color channels in the m frames of registered images and the reference frame image may be separated to obtain the channel image corresponding to each frame of image. The neural network may learn based on more associated information, for example, based on associated information between different images, associated information between different channels in an image, and associated information between channels in different images, to improve the image denoising effect in the low-illumination environment.

It should be understood that the different channels may be corresponding channel images in one frame of image, or may be associated information between channels in different frames of images. In addition, the associated information between frames may be associated information between same feature points in different frames of images, for example, may be associated information between one feature point A in different frames of images, or associated information between pixel values of feature points A in different frames of images. For example, the associated information may be correlation of information such as luminance, texture, noise, and details between different images. The associated information between channels may be correlation of information such as luminance, texture, and noise between channels.

With reference to the first aspect, in some implementations of the first aspect, the image set further includes a ghost image, and the ghost image is obtained from a difference between the m frames of registered images and the reference frame image.

In an example implementation, that the ghost image is obtained based on the m registration frame images and the reference frame images includes:

obtaining an $i^{th}$ registered image, and calculating a difference between an image feature of the $i^{th}$ image and an image feature of the reference frame image. This step is repeated to obtain an $m^{th}$ image obtained through difference calculation. The image features are fused to obtain a ghost image.

It should be understood that, when the image set that is input to the neural network includes the ghost image, the obtained output image may be a denoised and deghosted output image.

In this application, when the image set that is input to the neural network includes the ghost image, not only the denoised output image can be obtained, but also the ghost image can be removed from the output image.

With reference to the first aspect, in some implementations of the first aspect, the obtaining, based on an image set and the neural network model, a denoised output image includes: separating color channels in each frame of image in the image set to obtain a channel image corresponding to each frame of image, where the channel image includes a first channel image, a second channel image, and a third channel image; processing, by using the neural network, a channel image set corresponding to the image set, to obtain associated data, where the associated data includes one or more of associated information between images, associated information between different channels in an image, and associated information between channels in different images; obtaining a first target channel image of each frame of image based on the associated data, where the first target channel image includes a noise image of a first channel, a noise image of a second channel, and a noise image of a third channel; fusing image features of the m frames of registered images and calculating an average value, to obtain an average image; separating color channels in the average image to obtain a channel average image, where the channel average image includes an average image of the first channel, an average image of the second channel, and an average image of the third channel; superimposing features of the channel average image and the corresponding first target channel image to obtain a second target channel image; and combining channels in the second target channel image to obtain the denoised output image.

It should be understood that, when the image channel set includes the m frames of registered images, the reference frame image, and the ghost image, the associated data may be associated information between image frames, for example, may be associated information between the m frames of registered images and the reference image, may be associated information between the m frames of registered images and the ghost image, or may be associated information between the m frames of registered images, and the ghost image and the reference frame image. The associated data may alternatively be associated information between different channels in the image frame. The associated data may alternatively be associated information between channels in different image frames. The associated information between channels may be correlation of information such as luminance, texture, and noise between channels.

With reference to the first aspect, in some implementations of the first aspect, the first channel image, the second channel image, and the third channel image include an R channel image, a Y channel image, and a B channel image, where the Y channel image includes a Yb channel image and a Yr channel image.

The R channel image may indicate a red channel image in the image, and the Y channel image may indicate a full channel that is equivalent to a sum of RGB.

With reference to the first aspect, in some implementations of the first aspect, the first channel image, the second channel image, and the third channel image include an R channel image, a G channel image, and a B channel image, where the G channel image includes a Gb channel image and a Gr channel image.

The R channel image may indicate a red channel image in the image, the G channel image may indicate a green channel image in the image, and the B channel image may indicate a blue channel image in the image.

With reference to the first aspect, in some implementations of the first aspect, the N frames of raw images are Bayer format images.

With reference to the first aspect, in some implementations of the first aspect, the post-processing includes: performing dynamic range compression DRC processing on the output image to obtain a highly dynamic feature image; performing white balance AWB processing on the highly dynamic feature image to obtain a color corrected image; and performing image signal processing on the color corrected image to obtain the second image.

To be specific, when the output image output by the neural network model is the raw image, the raw image is further post-processed. For example, post-processing the output raw image may include DRC processing, AWB processing, and image signal processing, to obtain the second image, where the second image is the YUV image. In other words, the output raw image is post-processed to obtain the YUV image.

According to a second aspect, this technical solution provides an image display device, including: a detection unit, configured to detect a first operation of turning on a camera by a user; and a processing unit, configured to display a photographing interface on a display screen in response to the first operation, where the photographing interface includes a viewfinder frame, and the viewfinder frame includes a first image. The detection unit is further configured to detect a second operation of indicating the camera by the user. The processing unit is further configured to display a second image in the viewfinder frame in response to the second operation, where the second image is an image obtained by processing N frames of raw images captured by the camera. A neural network model is applied to a processing process. The neural network model uses an image whose noise is lower than a target threshold as an output objective. N is an integer greater than or equal to 2.

In this application, the first operation of turning on the camera by the user is detected, the second operation of indicating the camera by the user is detected, and the second image is displayed in the viewfinder frame of the display screen in response to the second operation, where the second image is the image obtained by processing the N frames of raw images captured by the camera. Because the raw image is an image that is not processed by an ISP or according to an algorithm of an accelerator, a form of noise in the raw image is not damaged. In this application, denoising processing is performed by obtaining the N frames of raw images, to improve an image denoising effect in a low-illumination environment.

Optionally, in an example implementation, the second image is a YUV image output by the neural network model.

Optionally, in another example implementation, the second image is a YUV image, and the YUV image is a YUV image obtained by post-processing a raw image output by the neural network model.

Optionally, in another example implementation, the second image is a raw image output by the neural network model.

The N frames of raw images are images captured by the camera. The camera is a module including a sensor and a lens. The N frames of raw images, for example, may be obtaining raw images generated by the sensor, raw images that are not accelerated according to the algorithm by the accelerator, for example, a neural network processing unit (neural-network processing unit, NPU), a graphics processing unit (graphics processing unit, GPU), a digital signal processor (digital signal processor, DSP), or another processor, and raw images that are not processed by an image signal processor (image signal processor, ISP). Therefore, an original form of the noise in the raw image is not damaged by processing of the algorithm. In other words, the noise in the raw image is closest to a scenario in which actual noise is introduced into the electronic device used by the user.

It should be noted that the raw image is different from the YUV image. The raw image is raw data obtained by converting a captured light source signal into a digital signal by the sensor. The YUV image is an image obtained by post-processing a raw image. The post-processing may convert the raw image into the YUV image, for example, through processing by the accelerator and the ISP.

It should be understood that the neural network model may be a pretrained or preconfigured neural network. Training data of the neural network may include a raw image and a noise image obtained after noise is added to the raw image. The raw image may be an image with little noise, for example, may be a raw image whose noise is lower than the target threshold.

Optionally, in an example implementation, the neural network model uses the raw image whose noise is lower than the target threshold as the output objective.

It should be further understood that the first image is a preview image in a very low-illumination scenario. For example, the first image may be a preview image of a night scenario, and more specifically, may be a preview image in a scenario with illumination less than 0.3 lux. The first image and the second image have same or substantially same display content. Image quality of the second image is better than that of the first image. For example, a color, luminance, a detail, and noise in the second image are better than those in the first image.

With reference to the second aspect, in some implementations of the second aspect, the detection unit is specifically configured to detect a second operation of indicating the first processing mode by the user.

For example, the first processing mode may be a professional shooting mode, a night shooting mode, or another mode. For example, the second operation of selecting the professional shooting mode or the night shooting mode by the user may be detected. In response to the second operation of selecting the professional shooting mode or the night shooting mode by the user, the electronic device configures a photosensitivity ISO value of the sensor to be within a target range, for example, sets the ISO value of the sensor of the electronic device to be greater than 12800. With reference to the second aspect, in some implementations of the second aspect, the detection unit is specifically configured to detect the second operation of indicating to photograph by the user, where the second operation is an operation used to indicate to photograph in a low-illumination environment.

For example, when the electronic device invokes the sensor and detects the low-illumination scenario, for example, a scenario with illumination less than 0.3 lux, the second operation may be indicating to photograph by the user. The second operation of indicating to photograph may be pressing a photographing button in the electronic device by the user, may be indicating, through voice, the electronic device to photograph by the user equipment, or may further include another action of indicating the electronic device to photograph by the user.

Further, when the electronic device invokes the sensor and detects that the electronic device is currently in the scenario with illumination less than 0.3 lux, the electronic device may configure the photosensitivity ISO value of the sensor to be within the target range. This is not limited in this application.

With reference to the second aspect, in some implementations of the second aspect, the processing unit is specifically configured to perform registration processing on the m frames of to-be-processed images based on the reference frame image, to obtain m frames of registered images; and obtain, based on an image set and the neural network model, a denoised output image, where the image set includes the m frames of registered images and the reference frame image, and the output image is the second image.

To be specific, in an example implementation, the output image output by the neural network model is the second image, in other words, the image output by the neural network may be the YUV image. The YUV image is displayed in the viewfinder frame of the display screen.

In an example implementation, the processing unit is specifically configured to perform registration processing on the m frames of to-be-processed images based on the reference frame image, to obtain m frames of registered images; and obtain, based on an image set and the neural network model, a denoised output image, where the image set includes the m frames of registered images and the reference frame image, and the second image is a post-processed output image.

To be specific, in an example implementation, the output image output by the neural network model is the raw image, and the raw image is post-processed inside the electronic device. For example, the output raw image is processed by the accelerator and the ISP to obtain the YUV image, and the YUV image is displayed in the viewfinder frame of the display screen.

In an example implementation, the detection unit is configured to obtain N frames of raw images, where the N frames of raw images include a reference frame image and m frames of to-be-processed images, N is an integer greater than or equal to 2, and m is a positive integer less than N. The processing unit is configured to perform registration processing on the m frames of to-be-processed images based on the reference frame image, to obtain m frames of registered images. The processing unit is further configured to obtain, based on the m frames of registered images, the reference frame image, and the neural network, a denoised output image, wherein the neural network model uses an image whose noise is lower than the target threshold as the output objective.

In this application, the N frames of raw images may be obtained, and registration processing may be performed on the m frames of to-be-processed images in the N frames of raw images based on the reference frame image, to obtain the m frames of registered images. The denoised output image may be obtained based on the image set and the neural network model. In this application, because the raw image is an image that is not processed by the ISP or according to the algorithm of the accelerator, the form of noise in the raw image is not damaged. In this application, denoising processing is performed by obtaining the N frames of raw images, to improve an image denoising effect in a low-illumination environment.

In an example implementation, the processing unit is specifically configured to determine the reference frame image and the m frames of to-be-processed images in the N frames of raw images based on a contrast of the N frames of raw images. The reference frame image may be an image with better image quality in the obtained N frames of images, for example, may be a clear image in the N frames of raw images.

In an example implementation, the processing unit is specifically configured to perform registration processing on each of the m frames of to-be-processed images based on the reference frame image by using an optical flow method, to obtain the m frames of registered images.

With reference to the second aspect, in some implementations of the second aspect, the processing unit is specifically configured to separate color channels in each frame of image in the image set to obtain a channel image corresponding to each frame of image, where the image set includes the m frames of registered images and the reference frame image, and the channel image includes a first channel image, a second channel image, and a third channel image; process, by using the neural network model, a channel image set corresponding to the image set, to obtain associated data, where the associated data includes one or more of associated information between images, associated information between different channels in an image, and associated information between channels in different images; obtain a target channel image of each frame of image based on the associated data, where the target channel image includes a noise image of a first channel, a noise image of a second channel, and a noise image of a third channel; and combine channels in the target channel image to obtain the denoised output image.

In an example implementation, the processing unit is specifically configured to preprocess the image set to obtain the channel image corresponding to each frame of image. The preprocessing includes: separating color channels, where the image set includes the m frames of registered images and the reference frame image, and the channel image includes the first channel image, the second channel image, and the third channel image; inputting the channel image corresponding to each frame of image in the image set to the neural network model as input data, to obtain the target channel image as output data of the neural network model, where the target channel image includes the noise image of the first channel, the noise image of the second channel, and the noise image of the third channel; and post-processing the target channel image to obtain the denoised output image, where the post-processing includes channel combination processing, DRC processing, AWB processing, and ISP processing.

It should be understood that, in an example implementation, either of the preprocessing and post-processing processes may be performed in the neural network model. Alternatively, in another example implementation, either of the preprocessing and post-processing processes may not be performed in the neural network model.

It should be understood that the noise image is a noise image estimated by using the neural network model. In other words, the noise image may be an estimated noise image, namely, a noise estimation image, obtained through processing by the neural network.

In this application, color channels in the m frames of registered images and the reference frame image may be separated to obtain the channel image corresponding to each frame of image. The neural network may learn based on more associated information, for example, based on associated information between different images, associated information between different channels in an image, and associated information between channels in different images, to improve the image denoising effect in the low-illumination environment.

It should be understood that the different channels may be corresponding channel images in one image, or may be associated information between channels in different images. In addition, the associated information between images may be associated information between same feature points in different images, for example, may be associated information between one feature point A in different images, or associated information between pixel values of feature points A in different images. For example, the associated information may be correlation of information such as luminance, texture, noise, and details between different frames of images. The associated information between channels may be correlation of information such as luminance, texture, and noise between channels.

With reference to the second aspect, in some implementations of the second aspect, the first channel image, the second channel image, and the third channel image include an R channel image, a Y channel image, and a B channel image, where the Y channel image includes a Yb channel image and a Yr channel image.

With reference to the second aspect, in some implementations of the second aspect, the first channel image, the second channel image, and the third channel image include an R channel image, a G channel image, and a B channel image, where the G channel image includes a Gb channel image and a Gr channel image.

With reference to the second aspect, in some implementations of the second aspect, that the processing unit is specifically configured to obtain, based on the m frames of registered images, the reference frame image, and the neural network, a denoised output image includes: obtaining the output image based on the m frames of registered images, the reference frame image, the ghost image, and the neural network.

In an example implementation, that the ghost image is obtained based on the m registration frame images and the reference frame images includes:

obtaining an $i^{th}$ registered image, and calculating a difference between an image feature of the $i^{th}$ image and an image feature of the reference frame image. This step is repeated to obtain an $m^{th}$ image obtained through difference calculation. Image features are fused to obtain a ghost image.

It should be understood that, when the image set that is input to the neural network includes the ghost image, the obtained output image may be a denoised and deghosted output image.

In this application, when the image set that is input to the neural network includes the ghost image, not only the denoised output image can be obtained, but also the ghost image can be removed from the output image.

With reference to the second aspect, in some implementations of the second aspect, the processing unit is specifically configured to separate color channels in each frame of image in the image set to obtain a channel image corresponding to each frame of image, where the channel image includes a first channel image, a second channel image, and a third channel image; process, by using the neural network, a channel image set corresponding to the image set, to obtain associated data, where the associated data includes one or more of associated information between frames, associated information between different channels in a frame, and associated information between channels in different frames; obtain a first target channel image of each frame of image based on the associated data, where the first target channel image includes an estimated noise image of a first channel, an estimated noise image of a second channel, and an estimated noise image of a third channel; fuse image features of the m frames of registered images and calculate an average value, to obtain an average image; separate color channels in the average image to obtain a channel average image, where the channel average image includes an average image of the first channel, an average image of the second channel, and an average image of the third channel; superimpose features of the channel average image and the corresponding first target channel image to obtain a second target channel image; and combine channels in the second target channel image to obtain the denoised output image.

It should be understood that, when the image channel set includes the m frames of registered images, the reference frame image, and the ghost image, the associated data may be the associated information between frames, for example, may be associated information between the m frames of registered images and the reference image, may be associated information between the m frames of registered images and the ghost image, or may be associated information between the m frames of registered images, and the ghost image and the reference frame image. The associated data may alternatively be associated information between different channels in a frame, or associated information between channels in different frames. The associated information between channels may be correlation of information such as luminance, texture, and noise between channels.

In an example implementation, for example, the color channels in each frame of image in the image set are separated to obtain the channel image corresponding to each frame of image. The image set may include the m frames of registered images, the reference frame image, and the ghost image. The channel image may include an R channel image, a Yr channel image, a Yb channel image, and a B channel image.

In an example implementation, for example, the color channels in each frame of image in the image set are separated to obtain the channel image corresponding to each frame of image. The image set may include the m frames of registered images, the reference frame image, and the ghost image. The channel image may include an R channel image, a Gr channel image, a Gb channel image, and a B channel image.

It should be understood that, when the image channel set includes the m frames of registered images, the reference frame image, and the ghost image, the associated data may be the associated information between frames, for example, may be associated information between the m frames of registered images and the reference image, may be associated information between the m frames of registered images and the ghost image, or may be associated information between the m frames of registered images, and the ghost image and the reference frame image. The associated data may alternatively be associated information between different channels in a frame, or associated information between channels in different frames. The associated information between channels may be correlation of information such as luminance, texture, and noise between channels.

With reference to the second aspect, in some implementations of the second aspect, the N frames of raw images are Bayer format images.

With reference to the second aspect, in some implementations of the second aspect, the processing unit is specifically configured to perform dynamic range compression DRC processing on the output image to obtain a highly dynamic feature image; perform white balance AWB processing on the highly dynamic feature image to obtain a color corrected image; and perform image signal processing on the color corrected image to obtain the second image.

To be specific, when the output image output by the neural network model is the raw image, the raw image is further post-processed inside the electronic device. For example, post-processing the output raw image may include DRC processing, AWB processing, and image signal processing, to obtain the second image, where the second image is the YUV image. In other words, the output raw image is post-processed to obtain the YUV image.

According to a third aspect, this technical solution provides an image display device, including a display screen, a camera, one or more processors, a memory, a plurality of application programs, and one or more computer programs. The one or more computer programs are stored in the memory, and the one or more computer programs include instructions. When the instructions are executed by the device, the device performs the image display method in any possible implementation of any one of the foregoing aspects.

It should be noted that in this application, the electronic device has the display screen. The display screen may be a touchscreen, a flexible screen, a curved screen, or a screen in another form. The display screen of the electronic device has a function of displaying an image. A specific material and a shape of the display screen are not limited in this application.

According to a fourth aspect, an image display device is provided. The device includes a storage medium and a central processing unit. The storage medium may be a non-volatile storage medium, and the storage medium stores a computer-executable program. The central processing unit is connected to the non-volatile storage medium, and executes the computer-executable program to implement the method according to any one of the first aspect or the possible implementations of the first aspect.

According to a fifth aspect, a chip is provided. The chip includes a processor and a data interface. The processor reads, through the data interface, instructions stored in a memory, to perform the method according to any one of the first aspect or the possible implementations of the first aspect.

Optionally, in an implementation, the chip may further include a memory. The memory stores instructions. The processor is configured to execute the instructions stored in the memory. When the instructions are executed, the processor is configured to perform the method according to any one of the first aspect or the possible implementations of the first aspect.

According to a sixth aspect, a computer-readable storage medium is provided. The computer-readable storage medium stores program code to be executed by a device. The program code includes instructions for performing the method according to any one of the first aspect or the possible implementations of the first aspect.

BRIEF DESCRIPTION OF DRAWINGS

FIG. 11 is a schematic diagram of an image format according to an embodiment of this application;

DESCRIPTION OF EMBODIMENTS

Figure 1:
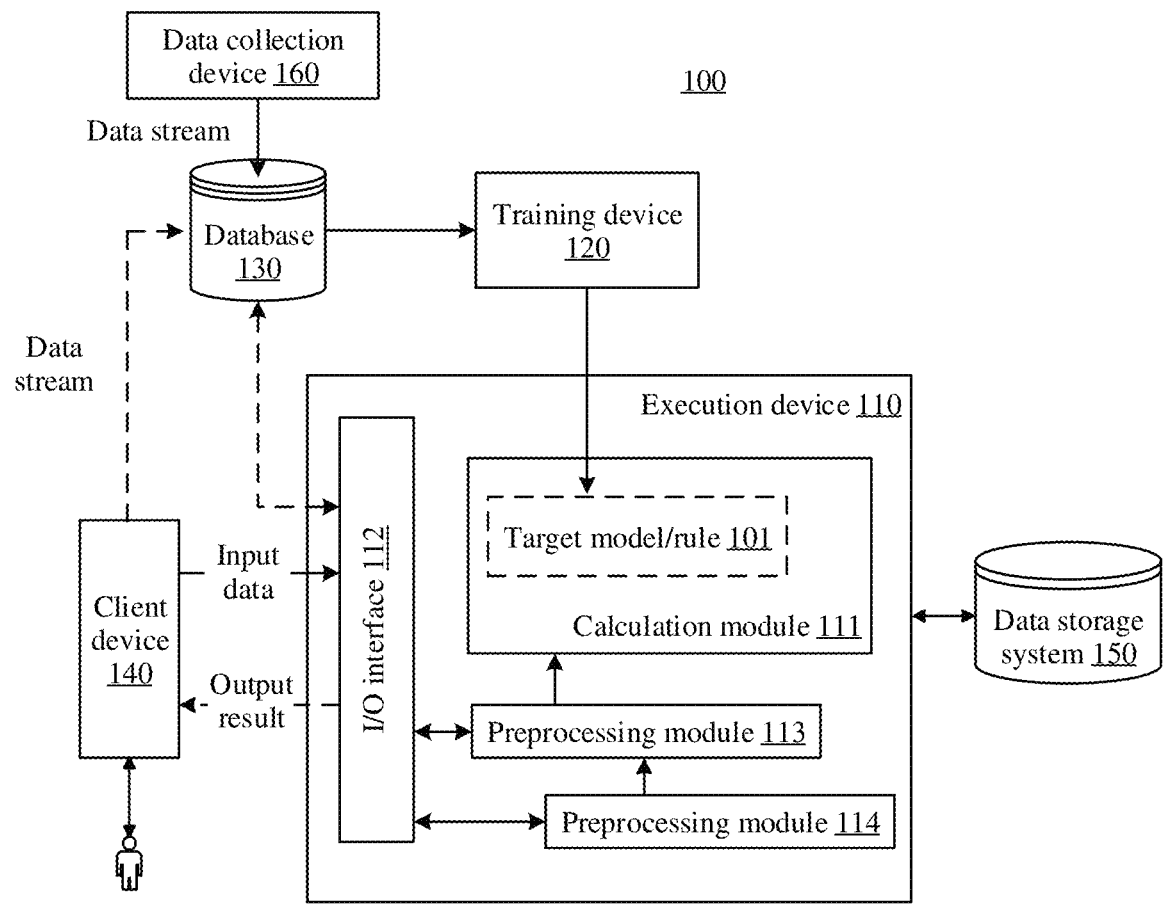
FIG. 1 is a schematic diagram of a system architecture according to an embodiment of this application.

The following describes technical solutions of this application with reference to the accompanying drawings.

An image display method provided in embodiments of this application can be applied to photographing, video recording, safe city, autonomous driving, human-machine interaction, and other scenarios in which an image needs to be processed and displayed, and low-level or high-level visual processing needs to be performed on the image. For example, low-level or high-level visual processing includes image recognition, image classification, semantic segmentation, video semantic analysis, video behavior recognition, and the like.

Specifically, the image display method in the embodiments of this application can be applied to a photographing scenario and a visual computing scenario based on an image and a video. The following separately briefly describes the photographing scenario and an image recognition scenario.

Photographing Scenario:

When photographing is performed by using a camera, a terminal device, or another intelligent electronic device, to display an image with better quality, noise in a photographed image may be removed by using the image display method in the embodiments of this application during photographing or after photographing. The image display method in the embodiments of this application can improve image quality, and improve an image display effect and accuracy of an image-based visual algorithm.

Image Recognition Scenario:

As artificial intelligence technologies are becoming more widespread, in many cases, content in an image needs to be recognized. When the image is recognized, noise in the image affects an image recognition effect to some extent. The image display method in the embodiments of this application is used to perform denoising processing on the image in an image recognition process or before image recognition starts, to improve image quality and the subsequent image recognition effect.

Some embodiments of this application relate to application of a large quantity of neural networks. Therefore, for ease of understanding, related terms and related concepts such as the neural network in the embodiments of this application are first described below.

(1) Neural Network

The neural network may include a neuron. The neuron may be an operation unit that uses $x_s$ and an intercept of b as an input, where an output of the operation unit may be as follows:

$$h_{W,b}(x) = f(W^T x) = f(\Sigma_{s=1}^{n} W_s x_s + b) \quad (1\text{-}1)$$

Herein, s=1, 2, ..., or n, n is a natural number greater than 1, $W_s$ is a weight of $x_s$, b is a bias of the neuron, and f is an activation function (activation functions) of the neuron, used to introduce a non-linear feature into the neural network, to convert an input signal in the neuron into an output signal. The output signal of the activation function may be used as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having many hidden layers. There is no special measurement criterion for the "many" herein. The DNN is divided based on locations of different layers, and a neural network in the DNN may be classified into three types: an input layer, a hidden layer, and an output layer. Usually, the first layer is the input layer, the last layer is the output layer, and the middle layer is the hidden layer. For example, in a fully connected neural network, layers are fully connected. In other words, any neuron at an $i^{th}$ layer needs to be connected to any neuron at an $(i+1)^{th}$ layer. Although the DNN seems complex, it is not complex for each layer. Simply speaking, the DNN is the following linear relationship expression: $\vec{y} = \alpha(W\vec{x} + \vec{b})$. $\vec{x}$ is an input vector, $\vec{y}$ is an output vector, $\vec{b}$ is an offset vector, W is a weight matrix (also referred to as a coefficient), and $\alpha()$ is an activation function. At each layer, the output vector $\vec{y}$ is obtained by performing such a simple operation on the input vector $\vec{x}$. Because there are many layers in the DNN, there are also many coefficients W and bias vectors $\vec{b}$. Definitions of these parameters in the DNN are as follows: The coefficient W is used as an example. It is assumed that in a DNN having three layers, a linear coefficient from the fourth neuron at the second layer to the second neuron at the third layer is defined as $W_{24}^{3}$. The superscript 3 indicates a layer at which the coefficient W is located, and the subscript corresponds to an output third-layer index 2 and an input second-layer index 4. In conclusion, a coefficient from a kth neuron at an $(L-1)^{th}$ layer to a $j^{th}$ neuron at an $L^{th}$ layer is defined as $W_{jk}^{L}$. It should be noted that there is no parameter W at the input layer. In the deep neural network, more hidden layers make the network more capable of describing a complex case in the real world. Theoretically, a model with more parameters indicates higher complexity and a larger "capacity", and indicates that the model can be used to complete a more complex learning task. Training the deep neural network is a process of learning a weight matrix, and a final objective of the training is to obtain a weight matrix of all layers of a trained deep neural network (a weight matrix formed by vectors W at many layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. A convolution process may be considered as using a trainable filter to perform convolution on an input image or a convolutional feature map. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons arranged in a rectangular form. Neurons on a same feature plane share a weight, where the shared weight is a convolution kernel. Weight sharing may be understood as that an image information extraction manner is irrelevant to a location. Principles implied herein are that statistical information of a part of an image is the same as that of other parts. In other words, image information learned for a part can also be used for other parts. Therefore, same learned image information can be used for all locations in the image. At a same convolutional layer, a plurality of convolution kernels may be used to extract different image information. Usually, a larger quantity of convolution kernels indicates richer image information reflected in a convolution operation.

The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

(4) A recurrent neural network (RNN) is used to process sequence data. In a conventional neural network model, from an input layer to a hidden layer and then to an output layer, the layers are fully connected, and nodes at each layer are not connected. Such a common neural network resolves many difficult problems, but is still incapable of resolving many other problems. For example, if a word in a sentence is to be predicted, a previous word usually needs to be used, because adjacent words in the sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in the current step, but also on a network status in several previous steps. The learning algorithm is referred to as a backpropagation through time (BPTT) algorithm.

Now that there is a convolutional neural network, why is the recurrent neural network required? A reason is simple. In the convolutional neural network, it is assumed that elements are independent of each other, and an input and an output are also independent, such as a cat and a dog. However, in the real world, many elements are interconnected. For example, stocks change with time. For another example, a person says: "I like traveling, and my favorite place is Yunnan. I will go if there is a chance." Herein, a person should know that "Yunnan" is filled in. A reason is that a person can deduce the answer based on content of the context. However, how can a machine do this? The RNN emerges. The RNN is intended to make the machine capable of memorizing like a human. Therefore, an output of the RNN needs to depend on current input information and historical memorized information.

(5) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(6) Pixel Value

A pixel value of an image may be a red green blue (RGB) color value, and the pixel value may be a long integer representing a color. For example, the pixel value is 256×red+100×green+76×blue, where blue represents a blue component, green represents a green component, and red represents a red component. For each color component, a smaller value indicates lower luminance, and a larger value indicates higher luminance. For a grayscale image, a pixel value may be a grayscale value.

(7) Image Registration

Image registration is alignment of two or more images of a same object at spatial locations. An image registration process may also be referred to as image matching or image correlation.

For example, a procedure of a registration technology may be as follows: first extracting features of two images to obtain feature points; finding a matched feature point pair through similarity measurement; then obtaining spatial coordinate transformation parameters of the images based on the matched feature point pair; finally, performing image registration based on the coordinate transformation parameters. Feature extraction is the key of the registration technology. Accurate feature extraction ensures successful feature matching.

(8) Photosensitivity

Photosensitivity, also referred to as an ISO value, is measurement of sensitivity of a film to light and is determined based on sensitivity measurement and by measuring several values.

(9) Image Noise

Image noise is a random variation of brightness or color information in images (there is no random variation in a photographed object). It is usually an aspect of electronic noise. It is usually produced by a sensor and circuitry of a scanner or digital camera. Image noise can also originate in film grain and in the unavoidable shot noise of an ideal photon detector. Image noise is an undesirable by-product of image capture that obscures the desired information.

(10) Ghosting

An exposure-level sequence of an obtained source contains dynamic information in dynamic scenarios, including a moving object or camera, and a hand shake. Small shifts between images at different exposure levels eventually lead to ghosting in a fused image. Ghosting may appear as an out-of-focus blur generated when images are fused.

As shown in FIG. 1, an embodiment of this application provides a system architecture 100. In FIG. 1, a data collection device 160 is configured to collect training data. In this embodiment of this application, the training data includes a raw image (the raw image herein may be an image that includes little noise, for example, may be a raw image whose noise is lower than a target threshold) and a noise image obtained after noise is added to the raw image.

After collecting the training data, the data collection device 160 stores the training data in a database 130, and a training device 120 obtains a target model/rule 101 through training based on the training data maintained in the database 130.

The following describes how the training device 120 obtains the target model/rule 101 based on the training data. The training device 120 processes an input raw image, and compares an output image with the raw image until a difference between the image output by the training device 120 and the raw image is less than a specific threshold. Training of the target model/rule 101 is completed.

The target model/rule 101 can be used to implement the image display method in this embodiment of this application. To be specific, a to-be-processed image is input to the target model/rule 101 after preprocessing, to obtain a denoised image. The target model/rule 101 in this embodiment of this application may specifically be a neural network. It should be noted that, in an actual application, the training data maintained in the database 130 is not necessarily all captured by the data collection device 160, and may be received from another device. In addition, it should be noted that the training device 120 does not necessarily perform training completely based on the training data maintained in the database 130 to obtain the target model/rule 101, but may obtain training data from a cloud or another place to perform model training. The foregoing description shall not constitute any limitation on this embodiment of this application.

The target model/rule 101 obtained through training by the training device 120 may be applied to different systems or devices, for example, an execution device 110 shown in FIG. 1. The execution device 110 may be a terminal, for example, a mobile phone terminal, a tablet computer, a laptop computer, augmented reality (AR)/virtual reality (VR) terminal, or a vehicle-mounted terminal, or may be a server, a cloud, or the like. In FIG. 1, the execution device 110 is provided with an input/output (I/O) interface 112, and is configured to exchange data with an external device. A user may input data to the I/O interface 112 by using a client device 140. The input data in this embodiment of this application may include a to-be-processed image input by using the client device.

A preprocessing module 113 and a preprocessing module 114 are configured to perform preprocessing based on the input data (for example, the to-be-processed image) received by the I/O interface 112. In this embodiment of this application, the preprocessing module 113 and the preprocessing module 114 may not exist (or only one exists). A computation module 111 is directly used to process the input data.

In a process in which the execution device 110 preprocesses the input data, or in a process in which the computing module 111 of the execution device 110 performs computing, the execution device 110 may invoke data, code, and the like in a data storage system 150 for corresponding processing, and may further store, in the data storage system 150, data, instructions, and the like that are obtained through the corresponding processing.

Finally, the I/O interface 112 returns a processing result, for example, the denoised output image, to the client device 140, to provide the denoised output image to the user.

It should be noted that the training device 120 may generate a corresponding target model/rule 101 based on different training data for different objectives or different tasks. The corresponding target model/rule 101 may be used to implement the objectives or complete the tasks, to provide a required result to the user. For example, the denoised output image may be provided to the user in this application.

As shown in FIG. 1, the target model/rule 101 is obtained through training by the training device 120. The target model/rule 101 in this embodiment of this application may be the neural network in this application. Specifically, the neural network provided in this embodiment of this application may be a CNN, a deep convolutional neural network (DCNN), a recurrent neural network (RNNS), and the like.

Figure 2:
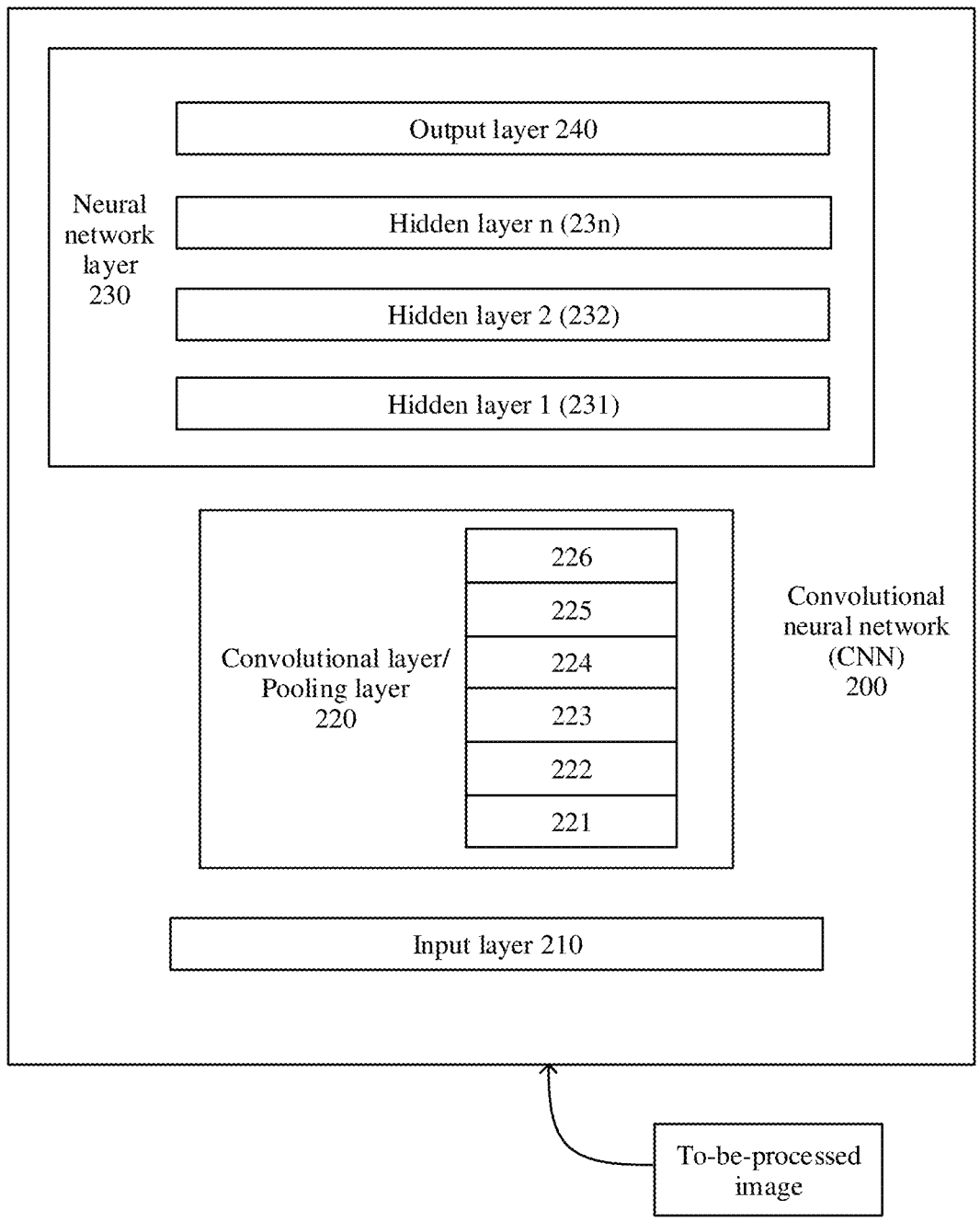
FIG. 2 is a schematic diagram of image denoising based on a CNN model according to an embodiment of this application.

Because the CNN is a common neural network, the following mainly describes a structure of the CNN in detail with reference to FIG. 2. As described in the foregoing basic concepts, a convolutional neural network is a deep neural network with a convolutional structure, and is a deep learning architecture. In the deep learning architecture, multi-layer learning is performed at different abstract levels by using a machine learning algorithm. As a deep learning architecture, the CNN is a feed-forward artificial neural network. Neurons in the feed-forward artificial neural network may respond to an input image.

As shown in FIG. 2, a convolutional neural network (CNN) 200 may include an input layer 210, a convolutional layer/pooling layer 220 (where the pooling layer is optional), and a neural network layer 230. The following describes the layers in detail.

Convolutional Layer/Pooling Layer 220:

Convolutional Layer:

As shown in FIG. 2, the convolutional layer/pooling layer 220 may include layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolutional layer 221 may include a plurality of convolution operators. The convolution operator is also referred to as a kernel. In image processing, the convolution operator functions as a filter that extracts specific information from a matrix of an input image. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction in the input image, to extract a specific feature from the image. A size of the weight matrix is related to a size of the image.

It should be noted that a depth dimension of the weight matrix is the same as a depth dimension of the input image. In a convolution operation process, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows x columns), namely, a plurality of same-type matrices, are applied. Outputs of the weight matrices are stacked to form a depth dimension of a convolutional image. The dimension herein may be understood as being determined based on the foregoing "plurality".

Different weight matrices may be used to extract different features from the image. For example, one weight matrix is used to extract edge information of the image, another weight matrix is used to extract a specific color of the image, and still another weight matrix is used to blur unneeded noise in the image. The plurality of weight matrices (rows x columns) have a same size. Feature maps extracted from the plurality of weight matrices with the same size also have a same size, and then the plurality of extracted feature maps with the same size are combined to form an output of the convolution operation.

Weight values in these weight matrices need to be obtained through a lot of training in an actual application. Each weight matrix formed by using the weight values obtained through training may be used to extract information from the input image, to enable the convolutional neural network 200 to perform correct prediction.

When the convolutional neural network 200 has a plurality of convolutional layers, a relatively large quantity of general features are usually extracted at an initial convolutional layer (for example, 221). The general feature may also be referred to as a low-level feature. As the depth of the convolutional neural network 200 increases, a feature extracted at a subsequent convolutional layer (for example, 226) becomes more complex, for example, a high-level semantic feature. A feature with higher semantics is more applicable to a to-be-resolved problem.

Pooling Layer:

A quantity of training parameters often needs to be reduced. Therefore, a pooling layer often needs to be periodically introduced after a convolutional layer. For the layers 221 to 226 shown in 220 in FIG. 2, one convolutional layer may be followed by one pooling layer, or a plurality of convolutional layers may be followed by one or more pooling layers. During image processing, the pooling layer is only used to reduce a space size of an image. The pooling layer may include an average pooling operator and/or a maximum pooling operator, to perform sampling on an input image to obtain an image with a relatively small size. The average pooling operator may be used to calculate pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input into the pooling layer. Each pixel in the image output from the pooling layer represents an average value or a maximum value of a corresponding sub-region of the image input into the pooling layer.

Neural Network Layer 230:

After processing performed at the convolutional layer/pooling layer 220, the convolutional neural network 200 is not ready to output required output information. As described above, at the convolutional layer/pooling layer 220, only a feature is extracted, and parameters resulting from an input image are reduced. However, to generate final output information (required class information or other related information), the convolutional neural network 200 needs to use the neural network layer 230 to generate an output of one required class or outputs of a group of required classes. Therefore, the neural network layer 230 may include a plurality of hidden layers (231, 232, . . . , and 23n shown in FIG. 2) and an output layer 240. Parameters included in the plurality of hidden layers may be obtained through pre-training based on related training data of a specific task type. For example, the task type may include image recognition, image categorization, and super-resolution image reconstruction.

At the neural network layer 230, the plurality of hidden layers are followed by the output layer 240, namely, the last layer of the entire convolutional neural network 200. The output layer 240 has a loss function similar to a categorical cross entropy, and the loss function is specifically used to calculate a prediction error. Once forward propagation (propagation in a direction from 210 to 240, as shown in FIG. 2) of the entire convolutional neural network 200 is completed, reverse propagation (propagation in a direction from 240 to 210, as shown in FIG. 2) is started to update a weight value and a deviation of each layer mentioned above, to reduce a loss of the convolutional neural network 200 and an error between a result output by the convolutional neural network 200 by using the output layer and an ideal result.

It should be noted that the convolutional neural network 200 shown in FIG. 2 is merely an example convolutional neural network. In specific application, the convolutional neural network may alternatively exist in a form of another network model.

Figure 3:
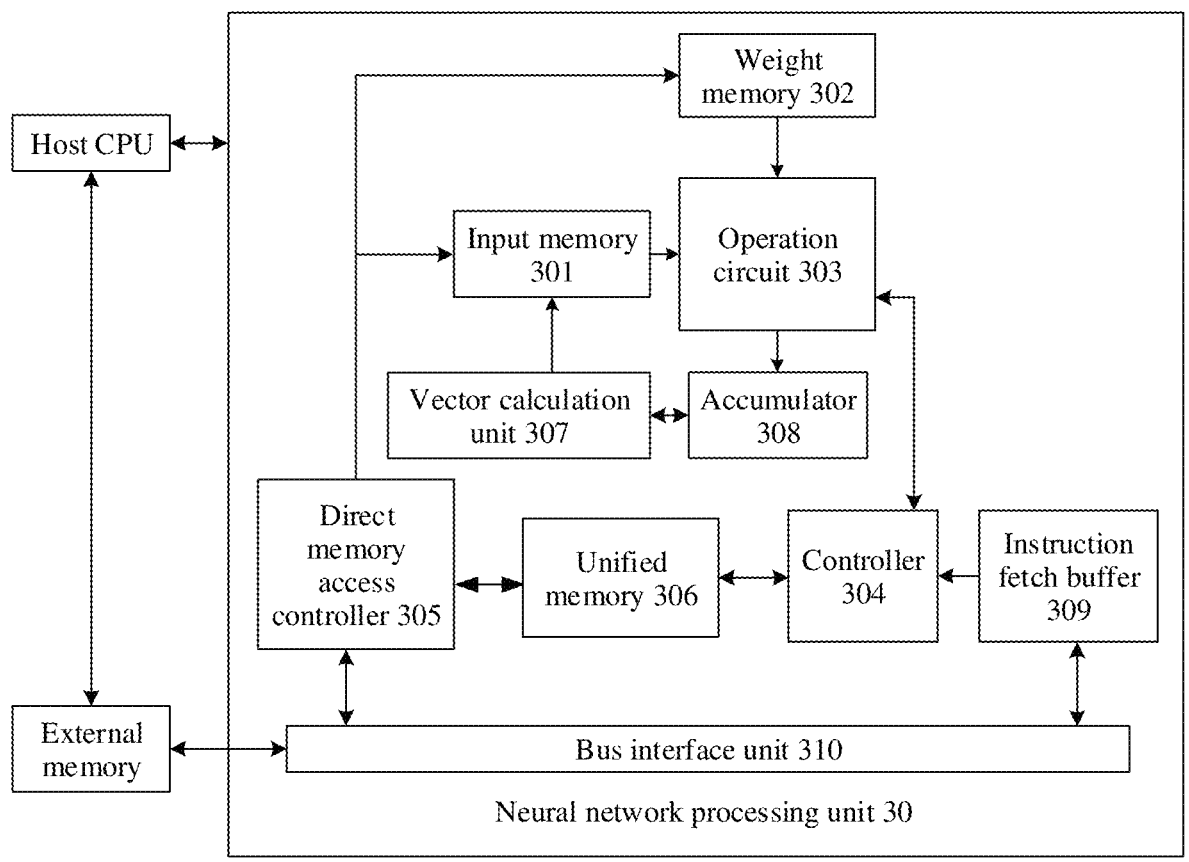
FIG. 3 is a schematic diagram of a hardware structure of a chip according to an embodiment of this application.

FIG. 3 shows a hardware structure of a chip according to an embodiment of this application. The chip includes a neural processing unit 30. The chip may be disposed in the execution device 110 shown in FIG. 1, to complete calculation of the calculation module 111. The chip may alternatively be disposed in the training device 120 shown in FIG. 1, to complete training of the training device 120 and output a target model/rule 101. All algorithms of the layers in the convolutional neural network shown in FIG. 2 may be implemented in the chip shown in FIG. 3.

The neural network processing unit NPU 30 is mounted to a host central processing unit (CPU) as a coprocessor, and the host CPU assigns a task. A core part of the NPU is an operation circuit 303, and a controller 304 controls the operation circuit 303 to extract data in an input memory 301 or a weight memory 302, and perform an operation.

In some implementations, the operation circuit 303 internally includes a plurality of processing engines (PE). In some implementations, the operation circuit 303 may be a two-dimensional systolic array. The operation circuit 303 may alternatively be a one-dimensional systolic array or another electronic circuit that can perform mathematical operations such as multiplication and addition.

In some implementations, the operation circuit 303 is a general-purpose matrix processor.

For example, it is assumed that there are an input matrix A, a weight matrix B, and an output matrix C. The operation circuit 303 fetches, from the weight memory 302, data corresponding to the matrix B, and buffers the data in each PE of the operation circuit. The operation circuit 303 fetches data of the matrix A from the input memory 301, to perform a matrix operation on the data of the matrix A and the matrix B, and stores an obtained partial result or an obtained final result of the matrix into an accumulator 308.

A vector calculation unit 307 may perform further processing such as vector multiplication, vector addition, an exponent operation, a logarithmic operation, or value comparison on output of the operation circuit 303. For example, the vector calculation unit 307 may be configured to perform network calculation, such as pooling, batch normalization, or local response normalization, at a non-convolution/non-FC layer of a neural network.

In some implementations, the vector calculation unit 307 can store a processed output vector into a unified cache 306. For example, the vector calculation unit 307 may apply a non-linear function to the output of the operation circuit 303. For example, the non-linear function is applied to a vector of an accumulated value to generate an activation value.

In some implementations, the vector calculation unit 307 generates a normalized value, a combined value, or both.

In some implementations, a processed output vector can be used as activation input to the operation circuit 303, for example, the processed output vector can be used at a subsequent layer of the neural network.

The unified memory 306 is configured to store input data and output data.

For weight data, a direct memory access controller (DMAC) 305 transfers input data in an external memory to the input memory 301 and/or the unified memory 306, stores weight data in the external memory into the weight memory 302, and stores data in the unified memory 306 into the external memory.

A bus interface unit (BIU) 310 is configured to implement interaction between the host CPU, the DMAC, and an instruction fetch buffer 309 by using a bus.

The instruction fetch buffer 309 connected to the controller 304 is configured to store instructions used by the controller 304. The controller 304 is configured to invoke the instructions buffered in the buffer 309, to control a working process of an operation accelerator.

Generally, the unified memory 306, the input memory 301, the weight memory 302, and the instruction fetch buffer 309 each are an on-chip memory. The external memory is a memory outside the NPU. The external memory may be a double data rate synchronous dynamic random access memory (DDR SDRAM), a high bandwidth memory (HBM), or another readable and writable memory.

Operations at various layers of the convolutional neural network shown in FIG. 2 may be performed by the operation circuit 303 or the vector calculation unit 307.

The execution device 110 in FIG. 1 described above can perform the steps of the image display method in this embodiment of this application. A CNN model shown in FIG. 2 and the chip shown in FIG. 3 may also be configured to perform the steps of the image display method in this embodiment of this application.

It should be further understood that in the embodiments of this application, "first", "second", "third", and the like are merely intended to indicate different objects, but do not represent other limitations on the indicated objects.

Figure 4:
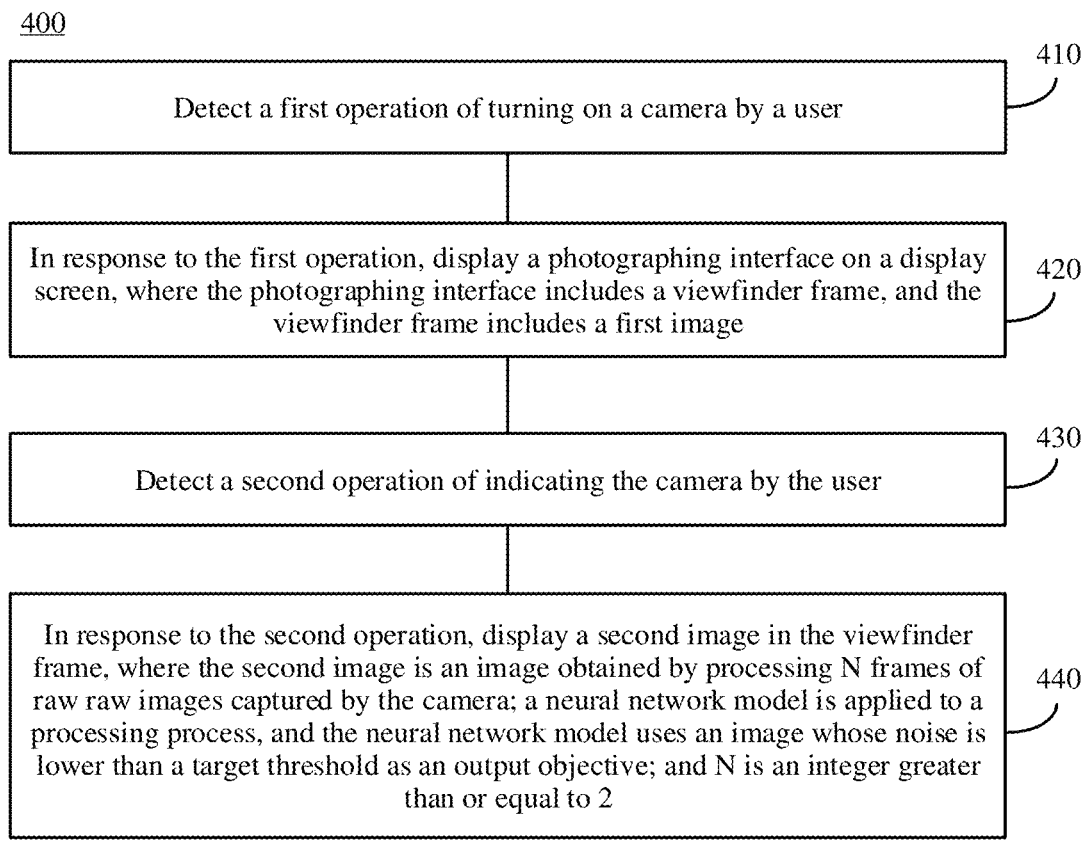
FIG. 4 is a schematic flowchart of an image display method according to an embodiment of this application.

The following describes the image display method in this embodiment of this application in detail with reference to FIG. 4. An image display device may be an electronic device having a function of displaying an image, and the electronic device may include a display screen and a camera. The electronic device may be a mobile terminal (for example, a smartphone), a computer, a personal digital assistant, a wearable device, a vehicle-mounted device, an internet of things device, or another device that can display an image.

The method shown in FIG. 4 includes steps 410 to 440. The following describes these steps in detail.

410: Detect a first operation of turning on a camera by a user.

420: In response to the first operation, display a photographing interface on the display screen, where the photographing interface includes a viewfinder frame, and the viewfinder frame includes a first image.

In an example, a photographing behavior of the user may include the first operation of turning on the camera by the user. In response to the first operation, the photographing interface is displayed on the display screen.

Figure 5A:
FIG. 5(a) and FIG. 5(b) are schematic diagrams of a group of display interfaces according to an embodiment of this application.

FIG. 5(a) shows a graphical user interface (GUI) of a mobile phone. The GUI is a home screen 510 of the mobile phone. When detecting an operation that the user taps an icon 520 of a camera application (APP) on the home screen 510, the mobile phone may start the camera application, and display another GUI shown in FIG. 5(b). The GUI may be referred to as a capture screen 530. The capture screen 530 may include a viewfinder frame 540. In a preview state, the viewfinder frame 540 may display a preview image in real time.

Figure 5B:
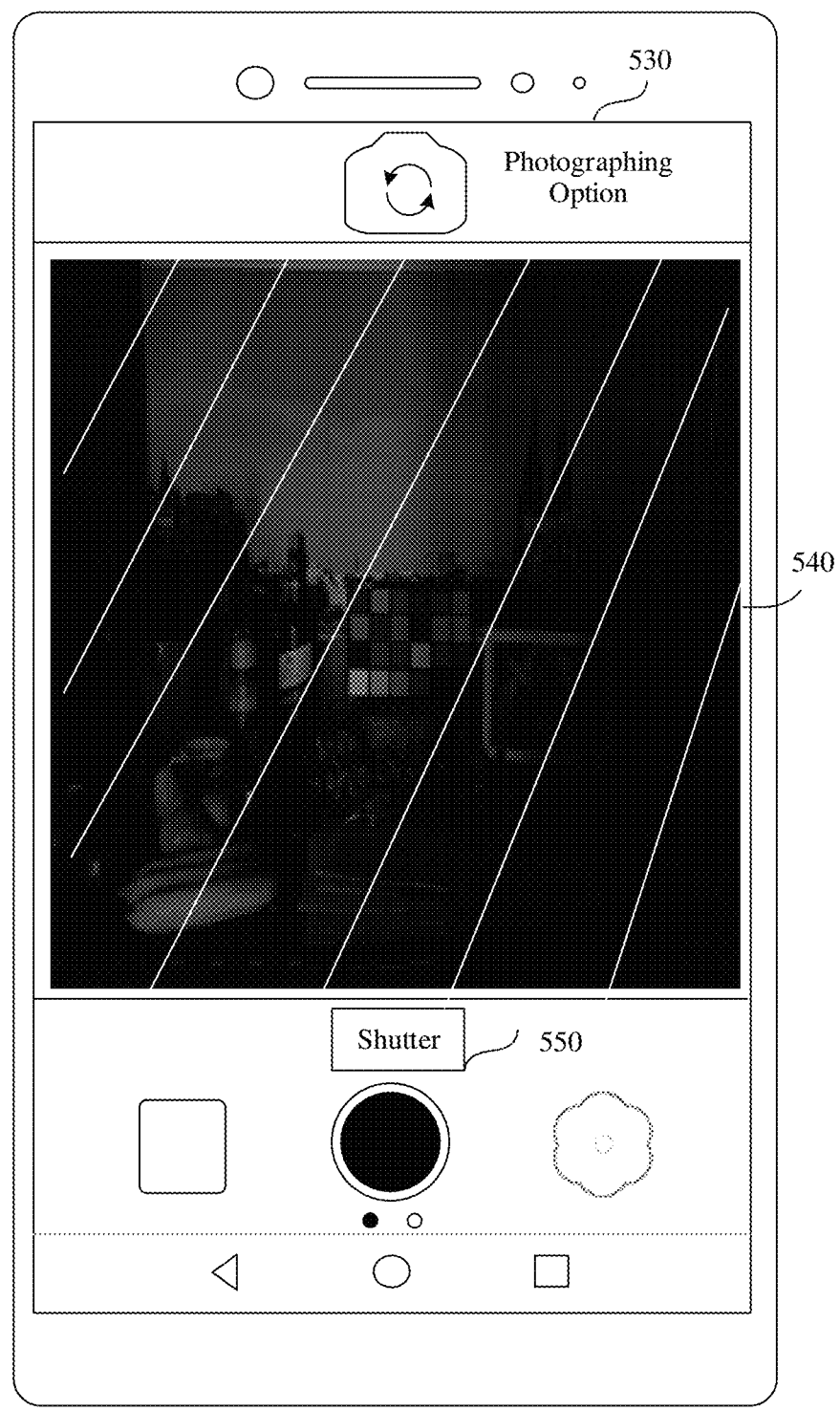

For example, in FIG. 5(b), after the electronic device turns on the camera, the first image may be displayed in the viewfinder frame 540. The first image is a color image. The photographing interface may further include a control 550 configured to indicate a photographing mode and another photographing control. It should be noted that in this embodiment of this application, a color image part is filled with dashed lines to distinguish the color image part from a grayscale image part.

In an example, the photographing behavior of the user may include the first operation of turning on the camera by the user. In response to the first operation, the photographing interface is displayed on the display screen. For example, after detecting the first operation that the user taps the icon of the camera application (APP) on the home screen, the electronic device may start the camera application to display the photographing interface. The photographing interface may include the viewfinder frame. It may be understood that the viewfinder frame may have different sizes in a shooting mode and in a recording mode. For example, the viewfinder frame may be a viewfinder frame in the shooting mode. The viewfinder frame in the recording mode may be an entire touchscreen. The preview image may be displayed in real time in the viewfinder frame in the preview state after the user turns on the camera and before the user presses a shooting/recording button.

In an example, the preview image may be a color image. Illuminance of an environment in which the current electronic device is located may be determined based on the preview image. For example, if luminance of a current preview image is relatively low, it indicates that the current electronic device is in a low-illumination environment. The low-illumination environment may be a scenario with illumination at or less than 0.3 lux.

430: Detect a second operation of indicating the camera by the user.

Figure 6A:
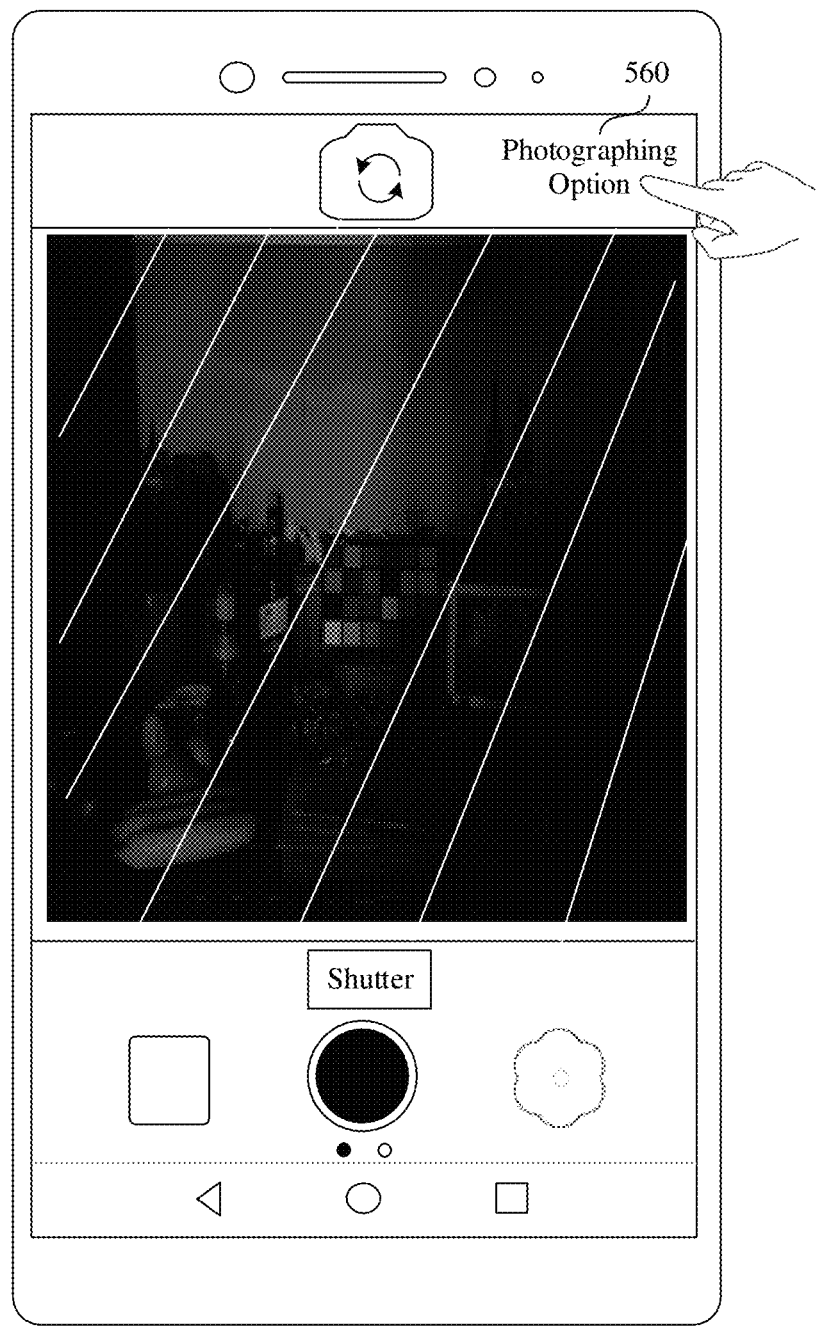
FIG. 6(a) and FIG. 6(b) are schematic diagrams of another group of display interfaces according to an embodiment of this application.
Figure 6B:
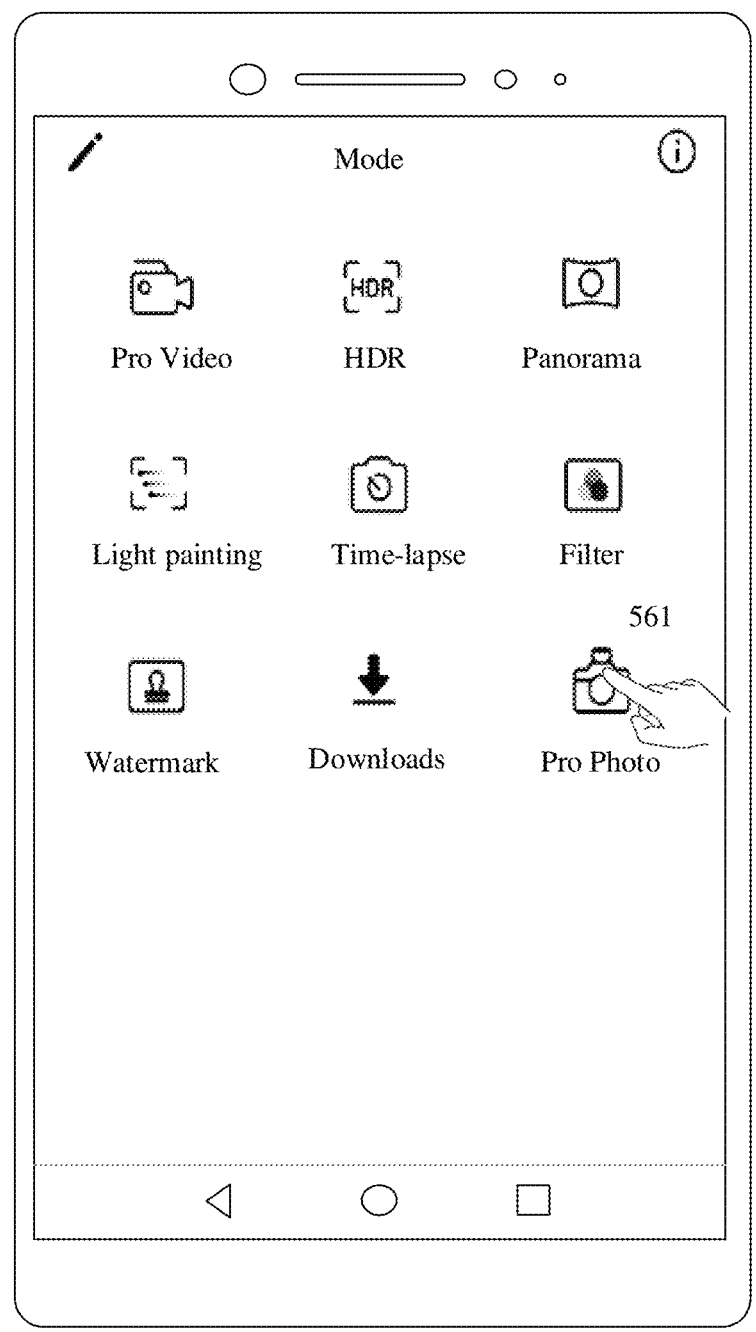

For example, a second operation of indicating a first processing mode by the user may be detected. The first processing mode may be a professional shooting mode, or the first processing mode may be a night shooting mode. Refer to FIG. 6(a). The photographing interface includes a photographing option 560. After the electronic device detects that the user taps the photographing option 560, the electronic device displays a shooting mode interface shown in FIG. 6(b). After the electronic device detects that the user taps a professional shooting mode 561 in the shooting mode interface, the mobile phone enters the professional shooting mode.

Figure 7:
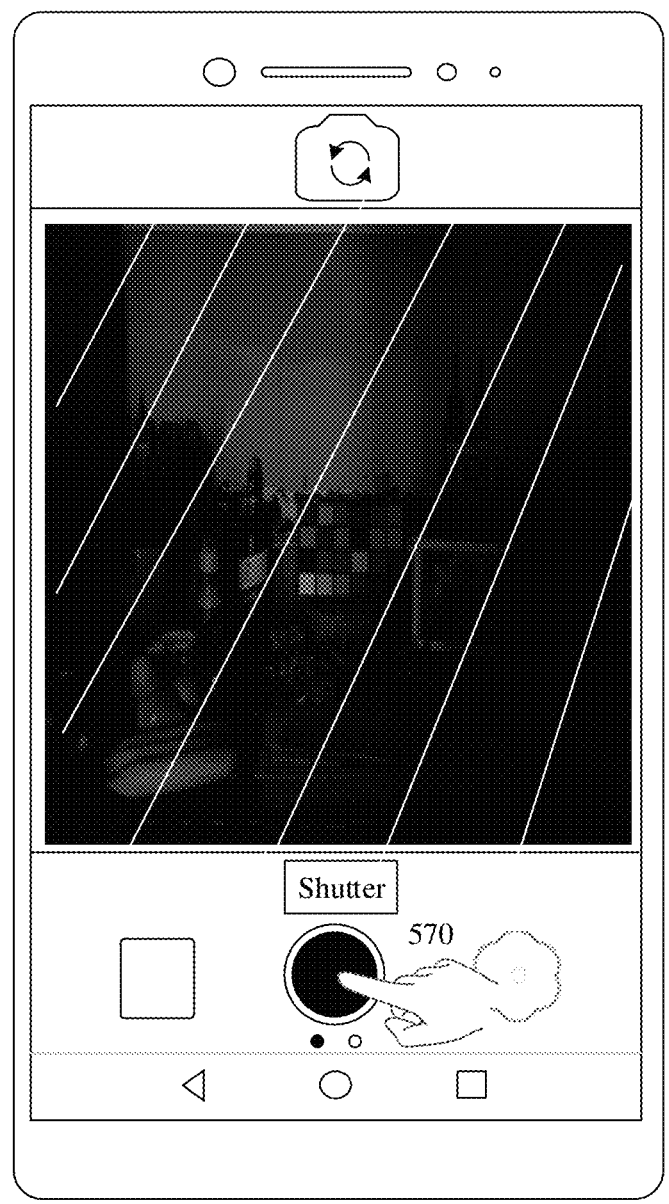
FIG. 7 is a schematic diagram of another group of display interfaces according to an embodiment of this application.

For example, a second operation of indicating to photograph by the user may be detected. The second operation is an operation used to indicate to photograph in low illumination. Refer to FIG. 7. In the low-illumination environment, the electronic device detects a second operation 570 of indicating to photograph by the user.

It should be understood that the second operation indicating a photographing behavior by the user may include pressing the shooting button of the camera of the electronic device, may include indicating, by user equipment through voice, the electronic device to perform the photographing behavior, or may further include indicating, by the user, another electronic device to perform the photographing behavior. The foregoing descriptions are examples, and do not constitute any limitation on this application.

440: In response to the second operation, display a second image in the viewfinder frame, where the second image is an image obtained by processing N frames of raw images captured by the camera; a neural network model is applied to a processing process, and the neural network model uses an image whose noise is lower than a target threshold as an output objective; and N is an integer greater than or equal to 2.

For example, the neural network model may use a raw image whose noise is lower than the target threshold as an output objective.

In this application, the first operation of turning on the camera by the user is detected, the second operation of indicating the camera by the user is detected, and the second image is displayed in the viewfinder frame of the display screen in response to the second operation, where the second image is the image obtained by processing the N frames of raw images captured by the camera. Because the raw image is an image that is not processed by an ISP or according to an algorithm of an accelerator, a form of noise in the raw image is not damaged. In this application, denoising processing is performed by obtaining the N frames of raw images, to improve an image denoising effect in a low-illumination environment.

Optionally, in an example implementation, the second image is a YUV image output by the neural network model.

Optionally, in an example implementation, the second image is a YUV image, and the YUV image is a YUV image obtained by post-processing a raw image output by the neural network model. The post-processing may convert a raw image into a YUV image, for example, may include DRC processing, AWB processing, and ISP processing.

Optionally, in an example implementation, the second image is a raw image output by the neural network model.

Figure 8:
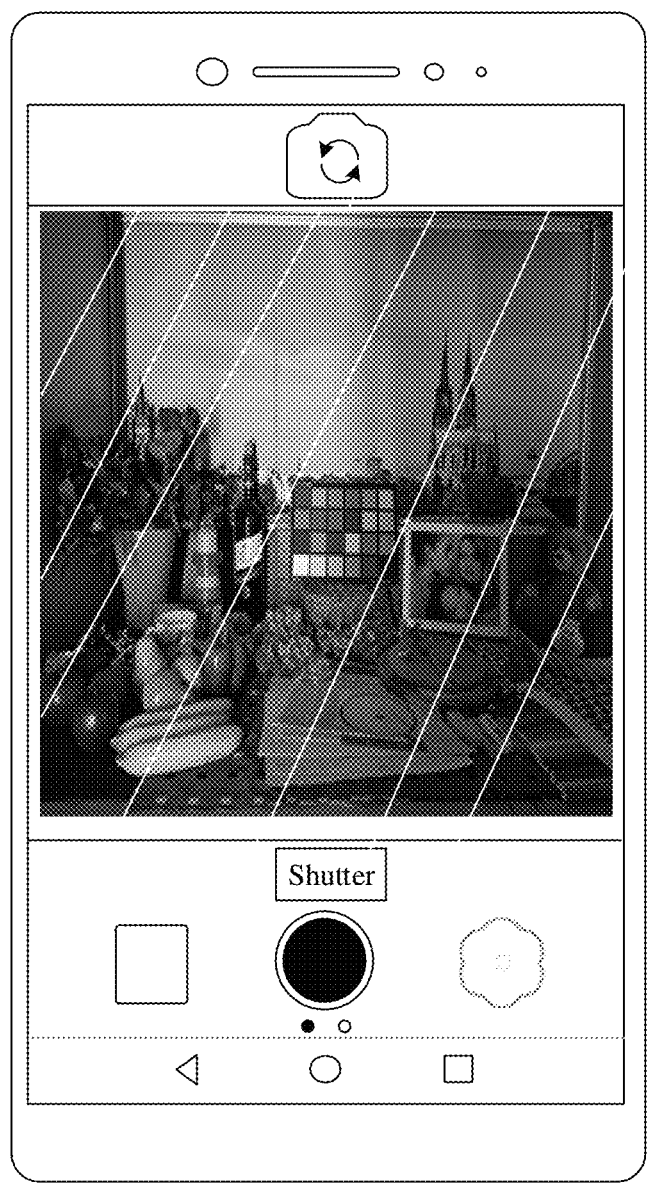
FIG. 8 is a schematic diagram of another group of display interfaces according to an embodiment of this application.

Refer to FIG. 8. The second image is displayed in the viewfinder frame in FIG. 8. The second image and the first image have same or substantially same content. However, image quality of the second image is better than that of the first image.

For example, in an example implementation, the second image is an output image of the neural network model, and the second image is a YUV image.

For example, in another example implementation, the second image is a YUV image obtained by post-processing an output image (for example, a raw image) of the neural network model.

For example, the post-processing may include: performing dynamic range compression DRC processing on the output image to obtain a highly dynamic feature image; performing white balance AWB processing on the highly dynamic feature image to obtain a color corrected image; and performing image signal processing on the color corrected image to obtain the second image.

To be specific, when the output image output by the neural network model is the raw image, the raw image is further post-processed inside the electronic device. For example, post-processing the output raw image may include DRC processing, AWB processing, and image signal processing, to obtain the second image, where the second image is the YUV image. In other words, the output raw image is post-processed to obtain the YUV image.

It should be understood that the first image is a preview image in a very low-illumination scenario. For example, the first image may be a preview image of a night scenario, and more specifically, may be a preview image in a scenario with illumination less than 0.3 lux. The image quality of the second image is better than that of the first image. For example, a color, luminance, a detail, and noise in the second image are better than those in the first image.

In this application, the electronic device processes the N frames of raw images captured by the camera. The raw image is different from the YUV image. The raw image is raw data obtained by converting a captured light source signal into a digital signal by a sensor. The YUV image is an image obtained by post-processing a raw image. The post-processing includes processing by the accelerator and the ISP. In other words, the noise in the raw image most resembles a scenario with real noise of the electronic device used by the user.

Figure 9:
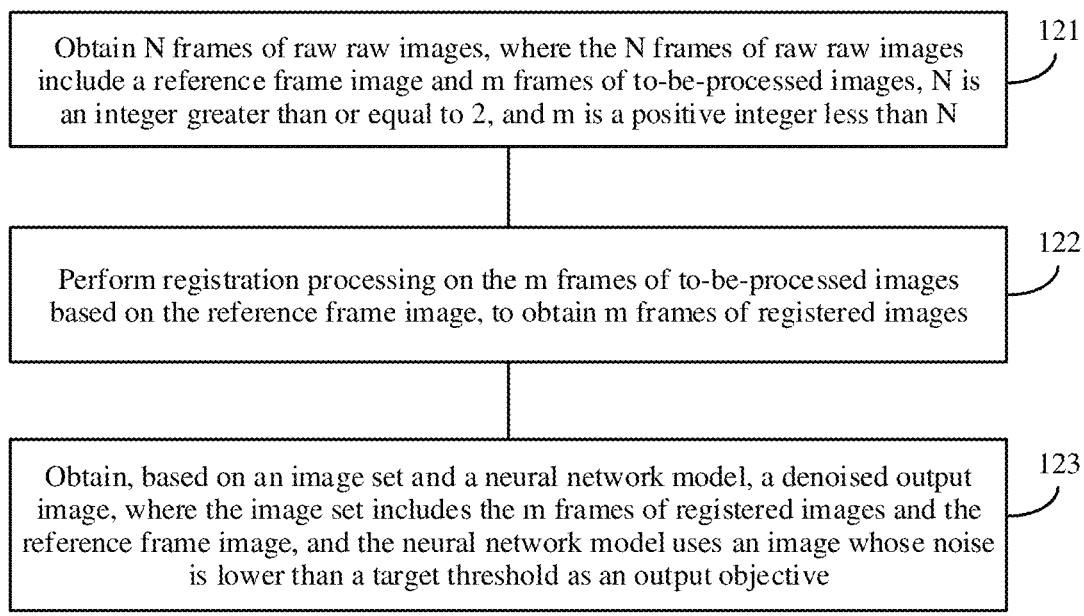
FIG. 9 is a schematic flowchart of an image display method according to an embodiment of this application.

In this application, the second image in step 440 is a processed output image by the neural network model in the electronic device, and the second image is the YUV image. With reference to FIG. 9, the following describes a process of obtaining the output image by the neural network model in detail in steps 121 to 123.

Step 121: Obtain N frames of raw images, where the N frames of raw images include a reference frame image and m frames of to-be-processed images, N is an integer greater than or equal to 2, and m is a positive integer less than N.

It should be understood that the obtained N frames of raw images may be the N frames of raw images captured by the camera of the electronic device in step 440.

For example, the camera is a module including a sensor and a lens. Obtaining the N frames of raw images may be obtaining raw images generated by the sensor. The raw images may be raw images that are not accelerated according to an algorithm by an accelerator, for example, a neural network processing unit (NPU), a graphics processing unit (GPU), a digital signal processor (DSP), or another processor, and raw images that are not processed by an image signal processor (ISP). Therefore, an original form of the noise in the raw image is not damaged by processing of the algorithm. In other words, the noise in the raw image is closest to a scenario in which actual noise is introduced into the electronic device used by the user.

In this embodiment of this application, that the electronic device meets a preset condition may be that the electronic device during photographing is in a low-illumination environment. In other words, a luminance value of the photographing interface displayed on the display screen may be lower than a target luminance value, for example, may be 80. Alternatively, that the electronic device meets the preset condition may be that an ISO value of the electronic device may be within a target range. For example, the target range may be that the ISO value is greater than 12800, and the ISO value of the electronic device may be set by the user. When the electronic device meets at least one of the foregoing conditions or all of the conditions, the electronic device may obtain the N frames of raw images from the sensor.

In an example, the electronic device detects the first operation of turning on the camera by the user, and starts the camera application to display the photographing interface. The photographing interface may include the viewfinder frame. The first image displayed in the viewfinder frame may be the preview image. For example, when the luminance value of the first image is lower than the target luminance value, and the second operation of indicating to photograph by the user is detected, the electronic device may obtain the N frames of raw images from the sensor.

In an example, the electronic device detects the first operation of turning on the camera by the user, and starts the camera application. Further, the second operation of indicating the camera by the user is detected. For example, the second operation indicating the first processing mode by the user is detected. The first processing mode may be a professional shooting mode, a night shooting mode, or another mode. For example, a second operation of detecting that the user selects the professional shooting mode or the night shooting mode may be detected. In response to the second operation of selecting the professional shooting mode or the night shooting mode by the user, the electronic device configures a photosensitivity ISO value of the sensor to be within a target range, for example, sets the ISO value of the sensor of the electronic device to be greater than 12800.

The obtained N frames of raw images may include the reference frame image and the m frames of to-be-processed images. The reference frame image may be an image with better image quality in the obtained N frames of images, for example, an image that is used as a reference frame may be selected from the obtained N frames of raw images based on a contrast.

Step 122: Perform registration processing on the m frames of to-be-processed images based on the reference frame image, to obtain m frames of registered images.

The registration processing may be considered as performing coordinate alignment between each of the m frames of to-be-processed images and a corresponding image feature point in the reference frame image.

For example, registration processing may be performed on each of the m frames of to-be-processed images based on the reference frame image by using an optical flow method.

Figure 10:
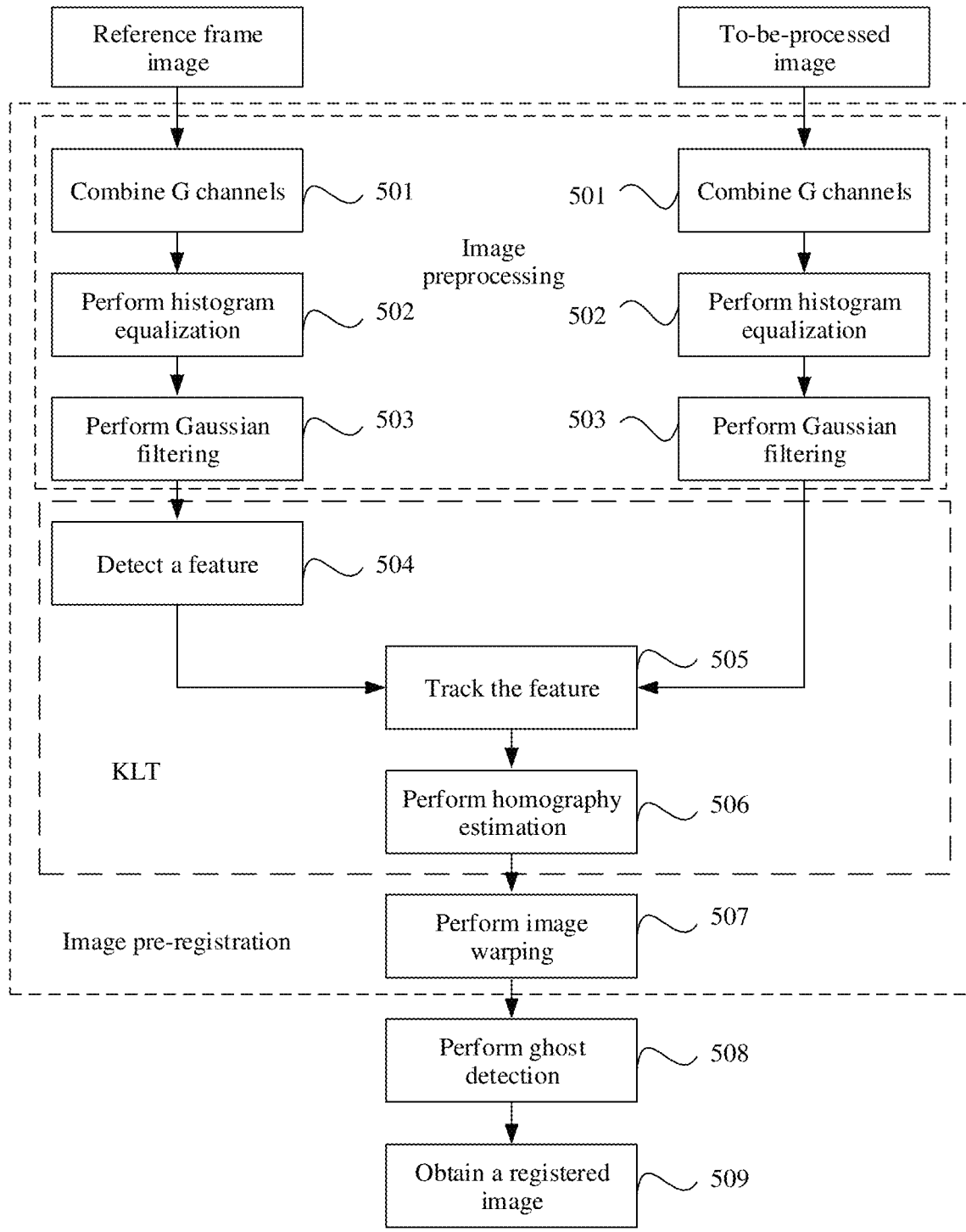
FIG. 10 is a schematic flowchart of an image registration processing method according to an embodiment of this application.

In an implementation, an image registration method shown in FIG. 10 may be used.

As shown in FIG. 10, registration processing between one frame of to-be-processed image and the reference frame image may include a processing process of image preprocessing, KLT, and image warping. Specifically, the method shown in FIG. 10 includes steps 501 to 509. The following separately describes the steps 501 to 509 in detail.

The image preprocessing process includes the steps 501 to 503. An input Bayer-domain raw image may be preprocessed to obtain a grayscale image. Specifically, details are as follows:

Step 501: Combine G channels in the one frame of to-be-processed image and G channels in the reference frame image respectively.

Step 502: Perform histogram equalization processing. To be specific, the to-be-processed image and the reference frame image whose G channels are combined have consistent image luminance.

Step 503: Perform Gaussian filtering on an image obtained by the histogram equalization processing, to separately obtain a grayscale image corresponding to the to-be-processed image and a grayscale image corresponding to the reference frame.

The Gaussian filtering processing is a type of linear smooth filtering, is used to eliminate Gaussian noise, and is applicable to a denoising process of image processing. Generally speaking, Gaussian filtering is a process of performing weighted averaging on an entire image. A value of each pixel is obtained by performing weighted averaging on the pixel value and other pixel values in a neighboring area. A specific operation of Gaussian filtering is to scan each pixel in an image by using a template (or referred to as convolution or mask), and replace a value of a center pixel with a weighted average grayscale value of the pixel in the neighboring image determined based on the template.

A KLT (kanade-lucas-tomasi) algorithm includes steps 504 to 507. The KLT algorithm calculates a homography matrix between a to-be-processed frame (Match frame) and a reference frame for two preprocessed grayscale images. A specific algorithm process is as follows:

Step 504: Detect a feature. To be specific, the reference frame image may be divided into 16×16 blocks of a same size. A maximum of three feature points can be detected in each block. It is ensured that a minimum horizontal distance and a minimum vertical distance between the feature points is 11.

Step 505: Track a feature point. To be specific, each feature point may be used as a center and a size of 11×11 is used as a patch. A patch that most resembles a patch in the reference frame image may be searched in the to-be-processed image. A center of the found most similar patch and the feature points of the reference frame image form a similar feature point pair.

Step 506: Perform homography estimation. To be specific, abnormal feature point pairs are iteratively eliminated using RANSAC, and then the homography matrix is calculated based on a filtered interior point set.

Step 507: Perform image warping processing. To be specific, the to-be-processed image may be transformed by using the homography matrix into a warp image similar to the reference frame image, and a closest interpolation warp algorithm may be used for different channels (four BGGR channels).

Step 508: Perform ghost detection, and calculate a difference between the warped image and the reference frame image, to obtain a ghost image and determine which feature points have ghosts. For example, if a difference of a feature point obtained after the difference calculation is larger, it indicates that the feature point has a ghost. If a difference of a feature point obtained after the difference calculation is smaller, it indicates that the feature point does not have a ghost.

Step 509: Obtain a registered image.

By way of example, and not limitation, it may be understood that the foregoing description of the registration processing process is merely intended to help a person skilled in the art understand the embodiments of this application, but is not intended to limit the embodiments of this application to the specific scenario illustrated. A person skilled in the art may make various equivalent modifications or changes according to the examples shown in FIG. 10, and such modifications or changes also fall within the scope of the embodiments of this application.

Step 123: Obtain, based on an image set and the neural network model, a denoised output image, where the neural network model uses an image whose noise is lower than a target threshold as an output objective, and the image set includes the m frames of registered images and the reference frame image.

In this embodiment of this application, the neural network model may be a preconfigured neural network shown in FIG. 1. The preconfigured neural network may be a neural network that is pretrained based on training data. The training data may include a raw image (the raw image herein may be an image that includes little noise, for example, may be a raw image whose noise is lower than the target threshold) and a noise image after noise is added to the raw image.

For example, the obtaining, based on an image set and the neural network model, a denoised output image may include: separating color channels in each frame of image in the image set, to obtain a channel image corresponding to each frame of image, where the image set includes the m frames of registered images and the reference frame image, and the channel image includes a first channel image, a second channel image, and a third channel image; and processing, by using the neural network model, a channel image set corresponding to the image set, to obtain associated data, where the associated data includes one or more of associated information between images (namely, associated information between frames), associated information between different channels in an image, and associated information between channels in different images; obtaining a target channel image of each frame of image based on the associated data, where the target channel image includes a noise image of a first channel, a noise image of a second channel, and a noise image of a third channel; and combining channels in the target channel image to obtain the denoised output image.

It should be understood that the noise image is a noise image estimated by using the neural network model. In other words, the noise image may be an estimated noise image, namely, a noise estimation image, obtained through processing by the neural network.

In an example implementation, the obtaining, based on an image set and the neural network model, a denoised output image includes:

performing preprocessing on the image set to obtain a channel image corresponding to each frame of image, where the preprocessing is separating color channels, the image set includes the m frames of registered images and the reference frame image, and the channel image includes a first channel image, a second channel image, and a third channel image; inputting the channel image corresponding to each frame of image in the image set into the neural network model as input data, to obtain output data of the neural network model as a target channel image, where the target channel image includes a noise image of a first channel, a noise image of a second channel, and a noise image of a third channel; and performing post-processing on the target channel image to obtain the denoised output image, where the post-processing includes channel combination processing, DRC processing, AWB processing, and ISP processing.

It should be understood that, in an example implementation, either of the preprocessing and post-processing processes may be performed in the neural network model. Alternatively, in another possible implementation, either of the preprocessing and post-processing processes may not be performed in the neural network model. This is not limited in this application.

For example, in this application, color channels in the image in the image set may be separated and input to the neural network model, so that the neural network model can perform learning based on more reference information.

For example, the neural network model may perform learning based on the input image set to obtain the associated data, and obtain the target channel image of each frame of image based on the associated data. In other words, the neural network model outputs the target channel image. It should be understood that the associated data is associated data obtained through learning in the neural network model based on an input image. For example, the associated data may include associated information between images, associated information between different channels in an image, and associated information between channels in different images.

For example, the associated information between images may be information such as luminance, texture, noise, and detail between images, or may be pixel values of a same feature point in different images. The associated information between channels may be correlation of information such as luminance, texture, noise, and details between different channels or a same channel of different images. The texture feature may be used to describe spatial color distribution and light intensity distribution of an image or some areas in the image.

Optionally, in an embodiment, the first channel image, the second channel image, and the third channel image may correspond to an R channel image, a Y channel image, and a B channel image. The Y channel image may include a Yb channel image and a Yr channel image, and the Y channel may indicate a full channel, which is similar to a sum of RGB. The Yb channel image are Y channel images on left and right adjacent sides of pixels including B. The Yr channel images are Y channel images on left and right adjacent sides of pixels including R.

Optionally, in an embodiment, the first channel image, the second channel image, and the third channel image may correspond to an R channel image, a G channel image, and a B channel image. The G channel image may include a Gb channel image and a Gr channel image. The Gb channel image may indicate a channel image in which a G channel is associated with a B channel. The Gr channel image may indicate a channel image in which the G channel is associated with an R channel.

For example, m being 2 is used as an example. Channels in a first frame of registered image may be separated to obtain a first channel image #1, a second channel image #1, and a third channel image #1. Channels in a second frame of registered image may be separated to obtain a first channel image #2, a second channel image #2, and a third channel image #2 that are corresponding to a second frame of registered image. The following describes an example in which the first channel image is an R channel image, the second channel image is a Yr channel image and a Yb channel image, and the third channel image is a B channel image. The first frame of registered image after channel separation processing may include an R channel image #1, a Yr channel image #1, a Yb channel image #1, and a B channel image #1. The second frame of registered image after channel separation processing may include an R channel image #2, a Yr channel image #2, a Yb channel image #2, and a B channel image #2. The reference frame image after channel separation processing may include an R channel image #3, a Yr channel image #3, a Yb channel image #3, and a B channel image #3. An image set is input to the neural network model. The image set includes the R channel images #1 to #3, the Yr channel images #1 to #3, the Yb channel images #1 to #3, and the B channel images #1 to #3. The neural network model may perform learning based on associated information between pixel values of same feature points in the first frame of registered image, the second frame of registered image, and the reference frame of image. The neural network model may also perform learning based on information such as luminance, texture, and noise between any channels of the R channel images #1 to #3, the Yr channel images #1 to #3, the Yb channel images #1 to #3, and the B channel images #1 to #3. The neural network model may perform learning between different channels corresponding to a same frame of image, or between same channels corresponding to different frames of images, to obtain associated data. It should be understood that the first channel image may alternatively be the R channel image, the second channel image may be the Gr channel image and the Gb channel image, and the third channel image may be the B channel image. This is not limited in this application.

Optionally, the N raw images may be Bayer format images.

When a Bayer format image is used, different colors can be set on a filter. Analysis of perception of colors by human eyes shows that the human eyes are more sensitive to green. Therefore, pixels in a green format in the Bayer format image may be a sum of an r pixel and a g pixel. In other words, a G channel image in an image may be a Gb channel image and a Gr channel image. The G channel image is determined based on the Gb channel image and the Gr channel image.

Figure 11:
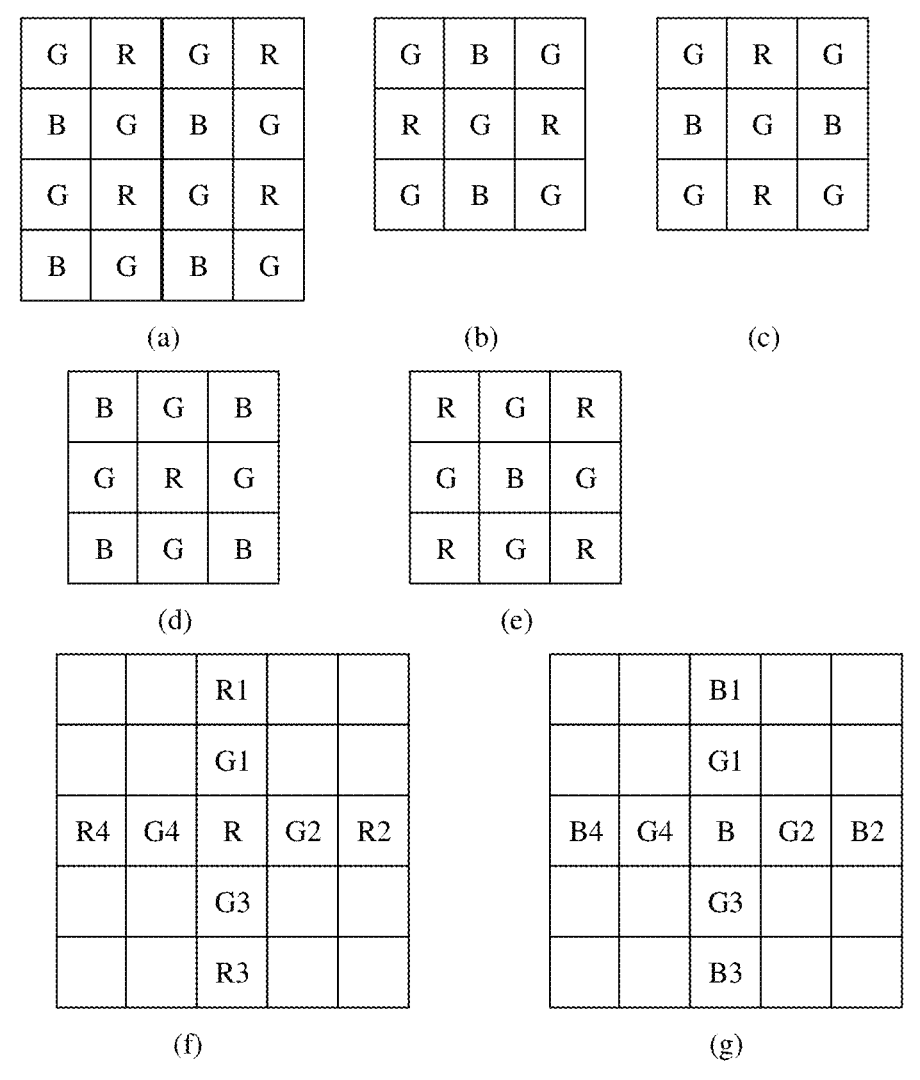

For example, FIG. 11(a) shows a Bayer color filter array, which usually includes G, ¼ of R, and ¼ of B. Each pixel may include only a part of a spectrum, and an RGB value of each pixel needs to be implemented through interpolation. To obtain an RGB format of each pixel from the Bayer format, two missing colors may be filled by interpolation. For example, domain, linear, and 3×3 interpolation methods may be used. A linear interpolation compensation algorithm is used as an example. As shown in FIG. 11(b) to FIG. 11(g), values of R and B in FIG. 11(b) and FIG. 11(c) each may be an average value of a neighboring image. An average value of four Bs in the neighboring image in FIG. 11(d) may be used as a B value of an intermediate pixel. An average value of four Rs in the neighboring image in FIG. 11(e) may be used as the B value of the intermediate pixel.

Further, an algorithm for a G value of the intermediate pixel in FIG. 11(f) may be as follows:

$$G(R) = \begin{cases} \frac{G1+G3}{2}, & |R1-R3| < |R2-R4| \\ \frac{G3+G4}{2}, & |R1-R3| > |R2-R4| \\ \frac{G1+G2+G3+G4}{4}, & |R1-R3| = |R2-R4| \end{cases} \quad (1\text{-}2)$$

Further, an algorithm for the G value of the intermediate pixel in FIG. 11(g) may be as follows:

$$G(B) = \begin{cases} \frac{G1+G3}{2}, & |B1-B3| < |B2-B4| \\ \frac{G3+G4}{2}, & |B1-B3| > |B2-B4| \\ \frac{G1+G2+G3+G4}{4}, & |B1-B3| = |B2-B4| \end{cases} \quad (1\text{-}3)$$

The foregoing algorithm for determining the pixel G (R) may be considered as a process of determining the Gb channel image, and the foregoing algorithm for determining the pixel G (B) may be considered as a process of determining the Gb channel image.

It should be understood that, in FIG. 11(a), left and right adjacent sides of the G channels in the first row are R channels. In other words, the G channels in the first row may indicate the Gr channel. Left and right adjacent sides of the G channels in the second row are B channels. In other words, the G channels in the second row may indicate the Gb channel.

In this application, the neural network model may learn based on the associated data, for example, which may include the associated information between frames, the associated information between different channels in a frame, and the associated information between channels in different frames, so that the neural network model may learn and be trained based on more related information. This improves denoising effect during image denoising.

In an example, the image set may further include the ghost image. The ghost image is obtained from a difference between the m frames of registered images and the reference frame image. The output image is obtained based on the m frames of registered images, the reference frame image, the ghost image, and the neural network model.

Optionally, the obtaining the ghost image based on the m frames of registered images and the reference frame image includes:

Step 1: Obtain an i$^{th}$ registered image.

Step 2: Calculate a difference between an image feature of the i$^{th}$ image and an image feature of the reference frame image.

The steps 1 and 2 are repeated to obtain an m$^{th}$ image obtained through difference calculation. The image features are fused to obtain a ghost image.

It should be understood that, when the image set that is input to the neural network includes the ghost image, the obtained output image may be a denoised and deghosted output image.

For example, the color channels in each frame of image in the image set are separated to obtain the channel image corresponding to each frame of image, where the image set may include the m frames of registered images, the reference frame image, and the ghost image, and the channel image may include the first channel image, the second channel image, and the third channel image. For example, the channel image may include the R channel image, the B channel image, the Yb channel image, and the Yr channel image, or the channel image may include the R channel image, the B channel image, the Gb channel image, and the Gr channel image. The channel image set corresponding to the image set is processed by using the neural network model, to obtain the associated data, where the associated data may include one or more of the associated information between frames, the associated information between different channels in a frame, and the associated information between channels in different frames. The first target channel image of each frame of image is obtained based on the associated data, where the first target channel image includes the noise image of the first channel, the noise image of the second channel, and the noise image of the third channel. The image features of the m frames of registered images are fused and the average value is calculated, to obtain an average image. The color channels in the average image are separated to obtain a channel average image, where the channel average image includes an average image of the first channel, an average image of the second channel, and an average image of the third channel. Features of the channel average image and the corresponding first target channel image are combined to obtain a second target channel image. Channels in the second target channel image are combined to obtain the denoised output image.

Further, in this application, when the image set that is input to the neural network model includes the ghost image, not only the denoised output image can be obtained, but also the ghost image can be removed from the output image.

Figure 12:
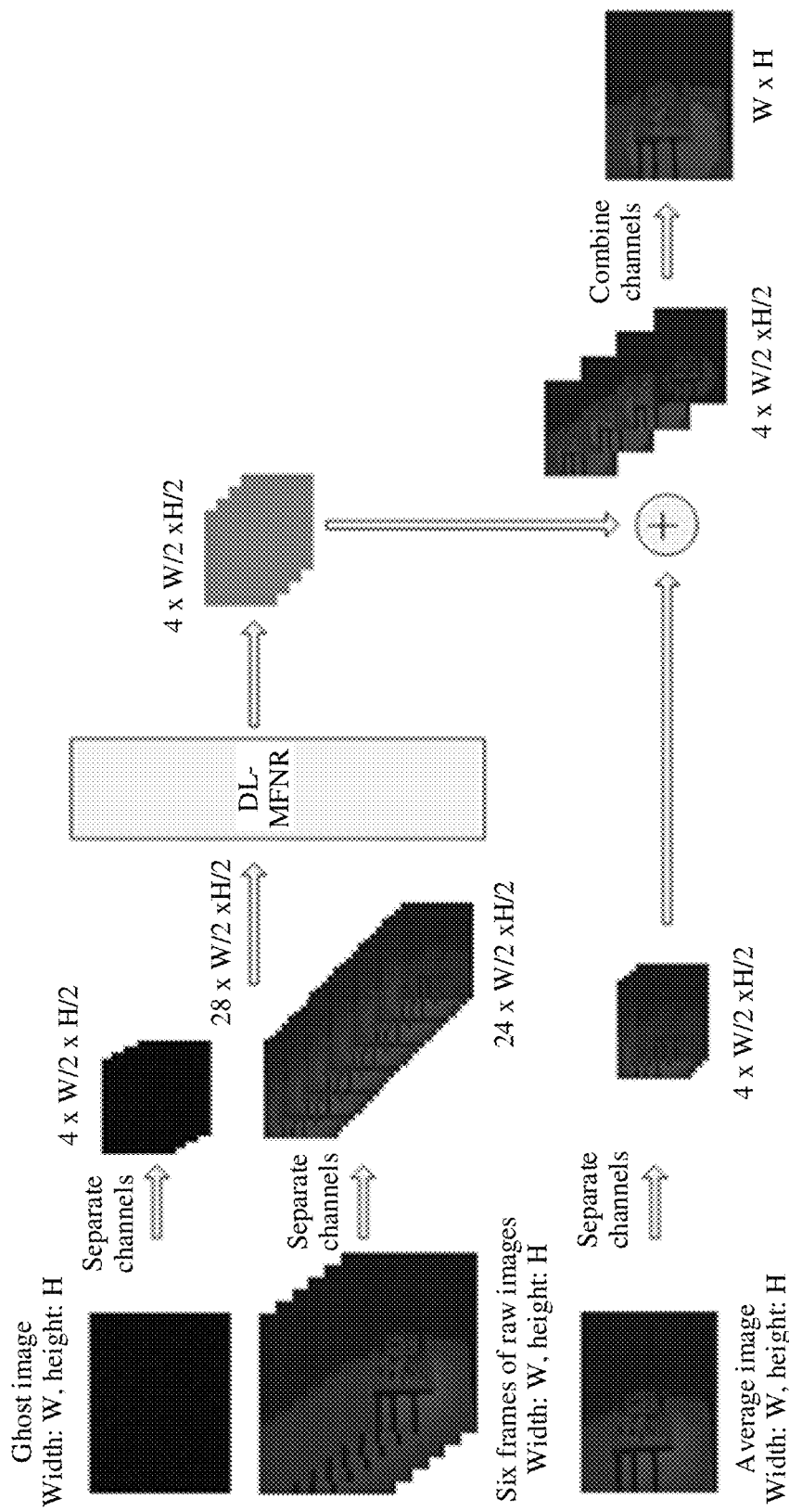
FIG. 12 is a schematic flowchart of an image display method according to an embodiment of this application.

The following describes a specific procedure by example with reference to FIG. 12.

As shown in FIG. 12, parameter settings of the input image and the output image are first briefly described.

A data source may include the m frames of registered images on which registration processing has been performed. The registered images may have a same size and a same exposure parameter, and the registered images may be color raw images that support a Bayer format. For example, a format of an image may be BGGR, RGGB, or RYYB (for formats other than BGGR, padding needs to be performed, the image is converted to BGGR, and a padding part needs to be removed from the output). The output raw image may correspond to the input image. Image data may be stored in a memory with stride not equal to width. A resolution of the input raw image is m x n, where m may be any one of {3264, 3648, . . . , 3968, 4608, 5120}, and n may be any one of {2056, 2240, 2448, 2736, 2976, 3456, 3840}.

For example, the input image in FIG. 12 is seven frames of raw images, and the seven frames of raw images include one frame of ghost image and six frames of raw registered images (a resolution of one frame of image is W x H). Channels in each of the seven frames of images are separated, and four raw images (with a resolution of W/2×H/2) whose width is a half of a width and whose height is a half of a height of the image are obtained for each frame of raw image, to obtain a total of 28 raw images. The 28 raw images are input to a deep learning-based multi-frame noise reduction (DL-MFNR) network, to obtain four output noise estimated images (for example, noise images). The four noise estimated images may correspond to different channels. For example, if an R channel image, a Gr channel image, a Gb channel image, and a B channel image are obtained when channels in the input image are separated, the four noise estimated images are an R channel noise estimated image, a Gr channel noise estimated image, a Gb channel noise estimated image, and a B channel noise estimated image. In addition, the channels may be separated based on BGGR or RYYB. Image features of the six frames of raw registered images are fused to obtain one frame of average image whose resolution is W x H. Channels in the average image are separated to obtain four subchannel images. The obtained four subchannel images and the four corresponding noise estimated images are separately superimposed to obtain target channel images corresponding to the four channels. Channels in the target channel images corresponding to the four channels are combined to obtain the output image.

In the DL-MFNR network, a corresponding channel image set may be processed to obtain associated data. When the image channel set includes the m frames of registered images, a reference frame image, and a ghost image, the associated data may be associated information between frames, for example, may be associated information between the m frames of registered images and a reference image, may be associated information between the m frames of registered images and the ghost image, or may be associated information between the m frames of registered images, and the ghost image or the reference frame image. Alternatively, the associated data may be associated information between different channels in a frame, or associated information between channels in different frames.

It should be noted that FIG. 12 shows an example in which the four channels in the raw image are separated. A specific quantity of channels to be separated is not limited in this application.

It should be understood that, FIG. 12 shows an example in which the color channels are separated and the channels are combined outside the neural network model. However, the color channels may also be separated and the channels may also be combined inside the neural network model. In other words, the neural network model may also have functions of color channel separation and channel combination. This is not limited in this application.

Figure 13:
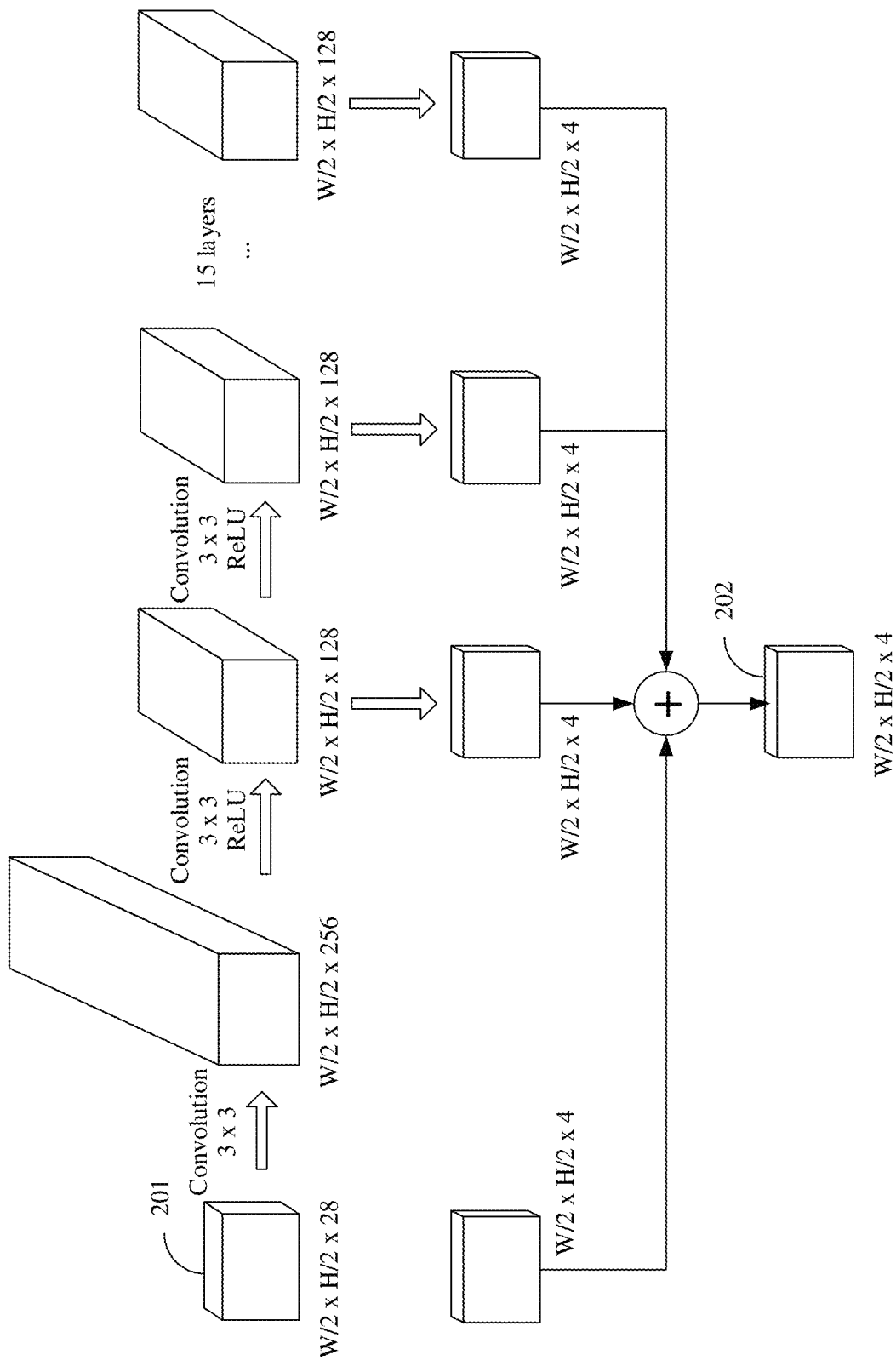
FIG. 13 is a schematic diagram of a structure of a neural network model according to an embodiment of this application.

FIG. 13 is a schematic diagram of a structure of a DL-MFNR network.

As shown in FIG. 13, FIG. 13 includes an input layer, a convolutional layer, a hidden layer, and an output layer. 201 may indicate the input layer, 202 may indicate the output layer, and the rest may include the convolutional layer and the hidden layer. W/2×H/2×28 shown in FIG. 13 may indicate 28 feature images whose resolution is W/2×H/2. ReLU indicates a rectified linear unit (ReLU).

In FIG. 13, a convolution operator is 3×3. The convolutional layer may include a plurality of convolution operators. The convolution operator is also referred to as a kernel. In image processing, the convolution operator functions as a filter that extracts specific information from a matrix of an input image. The convolution operator may essentially be a weight matrix, and the weight matrix is usually predefined. In a process of performing a convolution operation on an image, the weight matrix usually processes pixels at a granularity level of one pixel (or two pixels, depending on a value of a stride stride) in a horizontal direction in the input image, to extract a specific feature from the image. A size of the weight matrix is related to a size of the image. The output layer 201 has a loss function similar to a classification cross entropy, which is specifically used to calculate a prediction error. Once forward propagation of an entire convolutional neural network is completed, backward propagation starts to update weight values and deviations of the foregoing layers, to reduce a loss of the convolutional neural network, and an error between a result output by the convolutional neural network through the output layer and an ideal result. In the network shown in FIG. 13, an image whose noise is lower than a target threshold is used as an output objective, and iterative processing is continuously performed on a raw image that is input to the network, and a finally obtained raw image that infinitely resembles the output objective is output to the network.

It should be understood that a quantity of layers, a size of a convolution kernel, and a quantity of features at each convolutional layer of the neural network shown in FIG. 13 are examples. This application is not limited thereto.

It should be understood that the neural network model in this application may be the DL-MFNR network shown in FIG. 13.

Optionally, dynamic range compression (DRC) processing may further be performed on the obtained output image, to obtain a highly dynamic feature image. White balance (AWB) processing is performed on the highly dynamic feature image to obtain a color corrected image. Image signal processing is performed on the color corrected image to obtain the second image.

For example, the output image output by the neural network model is a raw image, and the raw image is post-processed inside the electronic device. For example, post-processing the output raw image may include DRC processing, AWB processing, and image signal processing, to obtain the second image. The second image is the YUV image. In other words, the output raw image is post-processed to obtain the YUV image.

Figure 14A:
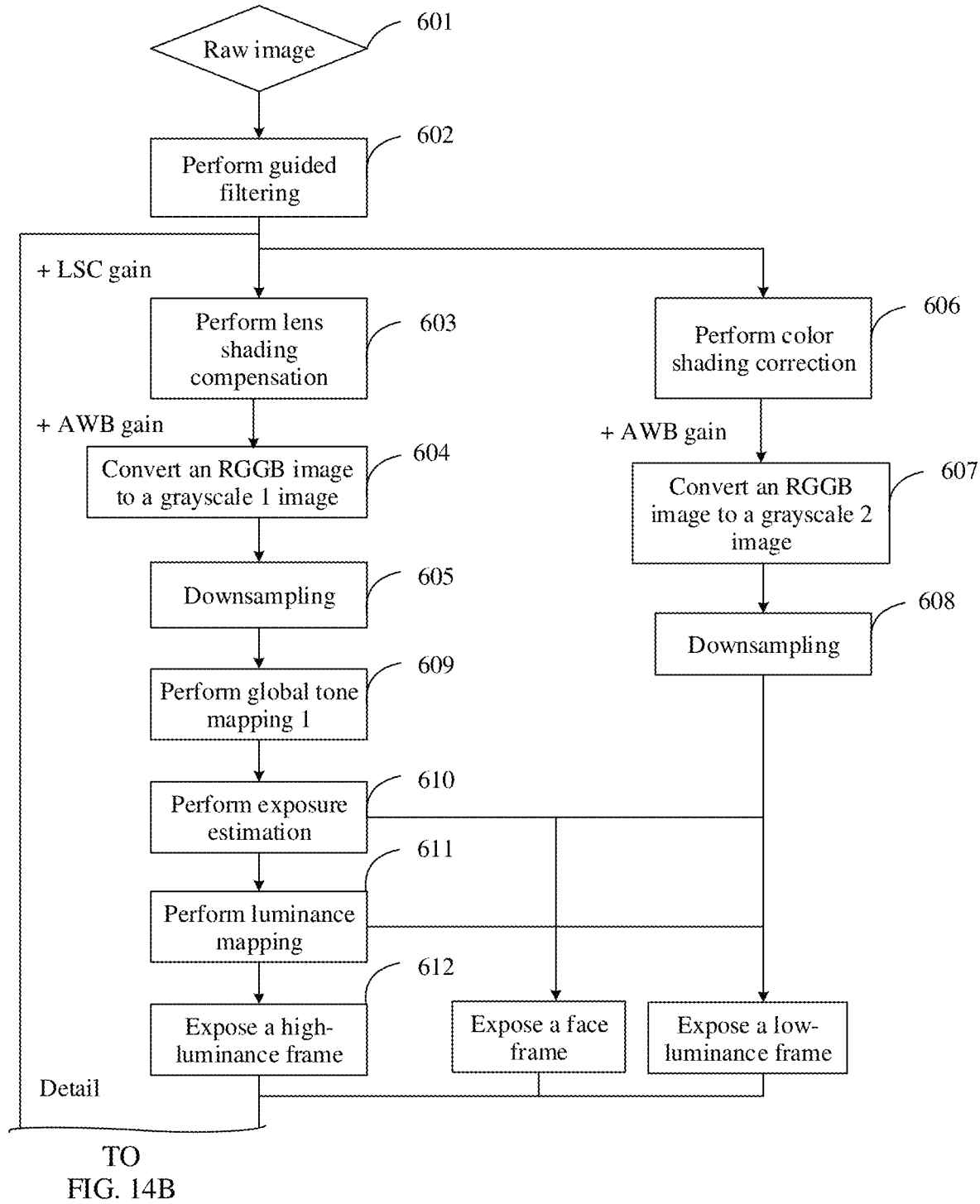
FIG. 14(A) and FIG. 14(B) are a schematic flowchart of a dynamic range compression processing method according to an embodiment of this application.
Figure 14B:
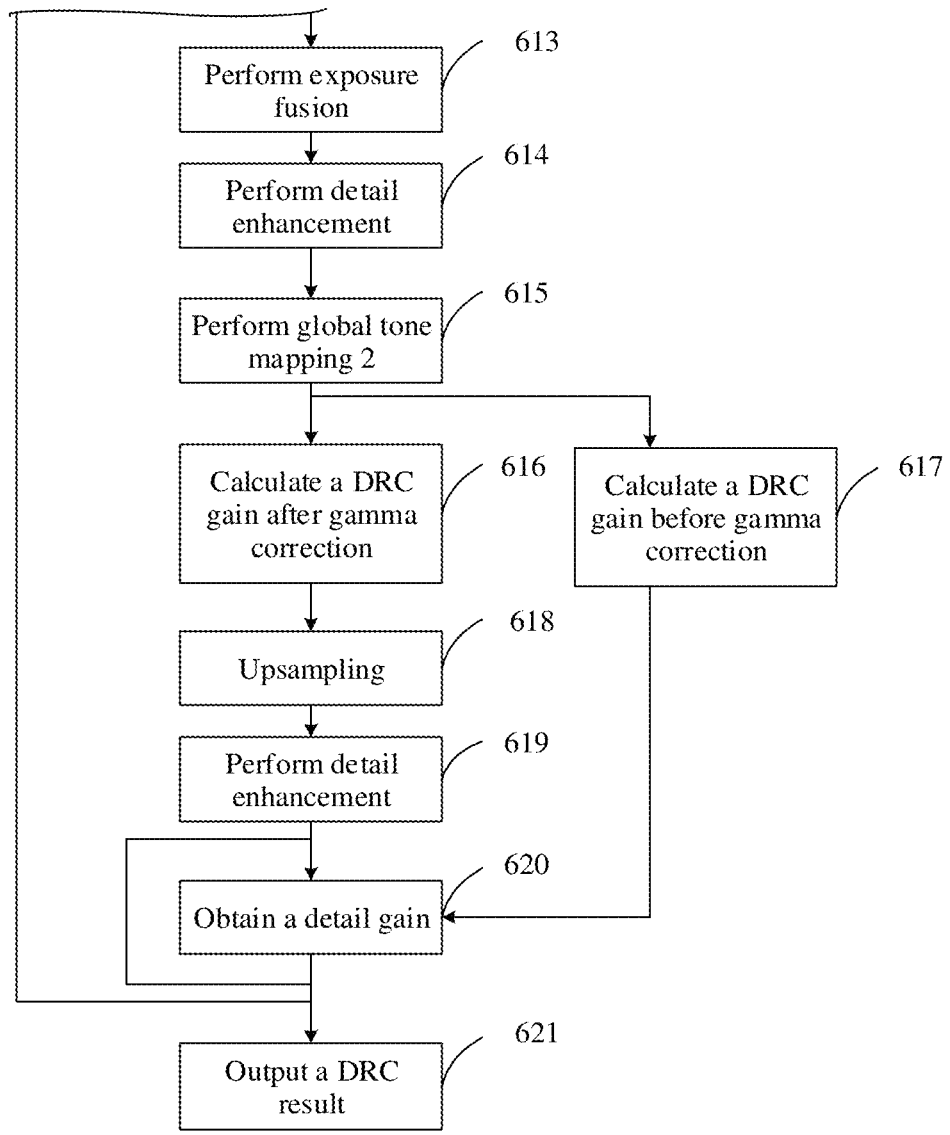

In an implementation, a dynamic range compression DRC processing method shown in FIG. 14(a) and FIG. 14(b) may be used.

As shown in FIG. 14(a) and FIG. 14(b), the DRC processing method includes steps 601 to 621. The following separately describes the steps 601 to 621 in detail.

Step 601: Obtain the raw image, to be specific, obtain the output image output by the neural network, where the output image may be a raw image.

Step 602: Perform guided filtering.

Channels in the raw image are filtered by using a guided filter, to obtain a detail layer and a base layer. The base layer is used to simulate exposure fusion to generate a highly dynamic image, and the detail layer is used for detail enhancement.

Step 603: Perform lens shading compensation. Lens shading compensation is performed on the base layer.

Step 604: Convert an RGGB image to a grayscale image 1. RGGB2GRAY is performed on the compensated image obtained in step 603, and a result is denoted as Gray1, where the grayscale image 1 is a basic image for subsequent HDR calculation.

Step 605: Perform downsampling. To reduce calculation overheads, downsampling processing may be performed on Gray1, to obtain ¼ of the original grayscale image 1, which is denoted as Gray_ds.

Step 606: Perform color shading correction.

Color shading correction is performed on the Base layer to eliminate a difference between shading values of four channels in a Bayer pattern.

Step 607: Convert an RGGB image to a grayscale image 2. RGGB2GRAY is performed on the corrected image obtained in step 605, and a result is image is denoted as Gray2. No lens shading compensation is performed on the grayscale image 2. Therefore, more light source details in a dark region can be retained for restoring a highlight region.

Step 608: Perform downsampling. To reduce calculation overheads, downsampling processing may be performed on Gray2, to obtain ¼ of the original grayscale image 2, which is denoted as Gray_Low_ds.

Step 609: Perform global tone mapping.

Global tone mapping is performed on Gray_ds obtained in step 605, to protect the dark region and prevent a brightened image from having no dark region.

Step 610: Perform exposure estimation.

Estimation is performed on Gray_ds obtained through global tone mapping in step 609, to simulate exposure parameters, including a light frame, a dark frame, and a face brightening frame of exposure.

Step 611: Perform luminance mapping.

A Retinex algorithm may be used. Luminance mapping is performed on Gray_ds to determine the light frame and the face brightening frame, and luminance mapping is performed on Gray_Low_ds to determine the dark frame.

Step 612: Expose a high-luminance frame.

Step 613: Perform exposure fusion.

A Gaussian filter is replaced by a guided filter according to a guided filter-based exposure fusion algorithm. An image that is created by using the guided filter can better maintain a contrast of the image. The fused image is denoted as Gray_F.

Step 614: Perform detail enhancement.

The guided filter is configured to perform edge-preserving filtering on Gray_F. The detail layer obtained through filtering is superimposed after being multiplied by a gain value to perform detail enhancement.

Step 615: Perform global tone mapping.

Global tone mapping 2 is performed on Gray_F to improve a global contrast.

Step 616: Calculate a DRC gain after gamma correction.

Step 617: Calculate a DRC gain before gamma correction.

The DRC gains before and after gamma correction (degamma) are calculated. The DRC gain before gamma correction is used to calculate a detail addback strength. The DRC gain after gamma correction is used to calculate a final DRC result.

Step 618: Perform upsampling.

The gamma-corrected DRC gain may be upsampled by four times.

Step 619: Perform detail enhancement. A high-frequency detail of DRC_Gain is enhanced using the guided filter.

Step 620: Obtain a detail gain.

An addback strength (Detail_Strength) of the detail layer in the RGGB domain is estimated.

Step 621: Output a DRC result.

The detail layer is added back to the raw image to obtain a resulting image.

It should be understood that the DRC processing method shown in FIG. 14(a) and FIG. 14(b) is used as an example. Another DRC processing method in a conventional technology may be applied to a specific procedure of DRC processing in this application. This is not limited in this application.

Figure 15:
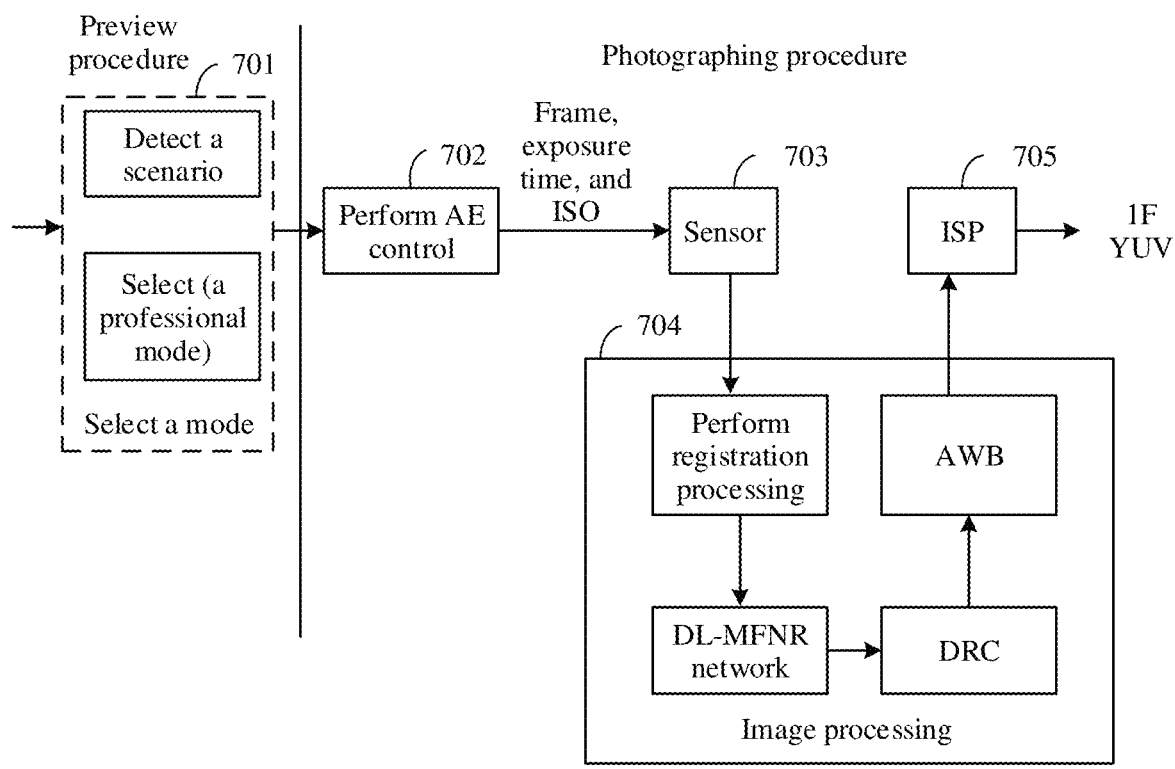
FIG. 15 is a schematic flowchart of an image display method according to an embodiment of this application.

FIG. 15 is a schematic flowchart of an image display method according to an embodiment of this application. The method shown in FIG. 15 includes steps 701 to 705. The steps 701 to 705 are described in detail below.

Step 701: Detect a scenario or select a professional mode.

For example, a first operation of turning on a camera by a user is detected. A photographing interface is displayed on a display screen in response to the first operation, where the photographing interface includes a viewfinder frame, and the viewfinder frame includes a first image. The first image is a preview image in a very low-illumination scenario. For example, the first image may be a preview image of a night scenario, and more specifically, may be a preview image in a scenario with illumination less than 0.3 lux. Further, when an electronic device invokes a sensor to detect the low-illumination scenario, for example, the scenario with illumination less than 0.3 lux, a second operation of indicating to photograph by the user is detected. The second operation of indicating to photograph may be pressing a photographing button in the electronic device by the user, may be indicating, through voice, the electronic device to photograph by the user equipment, or may further include another action of indicating the electronic device to photograph by the user.

For example, a second operation of indicating a first processing mode by the user is detected.

For example, the first processing mode may be a professional shooting mode, a night shooting mode, or another mode. For example, the second operation of selecting the professional shooting mode or the night shooting mode by the user may be detected. In response to the second operation of selecting the professional shooting mode or the night shooting mode by the user, the electronic device configures a photosensitivity ISO value of the sensor to be within a target range, for example, sets the ISO value of the sensor of the electronic device to be greater than 12800.

Step 702: The electronic device configures exposure time, the ISO, and a quantity of frames for the sensor.

For example, in the embodiment shown in FIG. 12, six frames of to-be-output raw images are configured.

Step 703: Obtain N frames of raw images from the sensor.

Step 704: Perform image processing on the N frames of raw images. This step includes:

Step 1: Perform registration processing.

For a specific procedure, refer to the possible implementation in step 122 shown in FIG. 9 and the registration processing flowchart shown in FIG. 10.

Step 2: Input the registered raw image to a DL-MFNR network for denoising processing.

Further, if the image that is input to the DL-MFNR network includes a ghost image, a denoised and deghosted output image may be obtained.

For a specific procedure, refer to the possible implementation in step 123 shown in FIG. 9 and the image processing method shown in FIG. 12.

Step 3: Obtain an output image output by the DL-MFNR network, to be specific, obtain an output raw image, and perform DRC processing on the output image.

For a specific procedure, refer to the DRC processing method shown in FIG. 14(a) and FIG. 14(b).

Step 4: Perform white balance AWB processing on a highly dynamic feature image obtained by DRC processing, to obtain a color corrected image.

Step 705: Process the obtained color corrected image by using an ISP to obtain a YUV image, to be specific, after a second image is obtained, display the second image in the viewfinder frame of the display screen of the electronic device.

FIG. 15 shows a process of image processing by the electronic device in the low-illumination scenario. For specific possible implementations of the steps, refer to descriptions in FIG. 4, FIG. 9, and FIG. 12.

It should be noted that FIG. 15 shows an example in which the output image output by a model of a neural network (namely, the DL-MFNR network) is the raw image. The output raw image further needs to be post-processed. The post-processing may include DRC, AWB, and ISP processing. It should be understood that the post-processing may be performed outside the neural network model, that is, the post-processing may not be performed in the neural network. In an example implementation, the neural network model may alternatively have a post-processing function. In other words, a post-processing procedure may alternatively be a step performed in the neural network model. This is not limited in this application.

Figure 16:
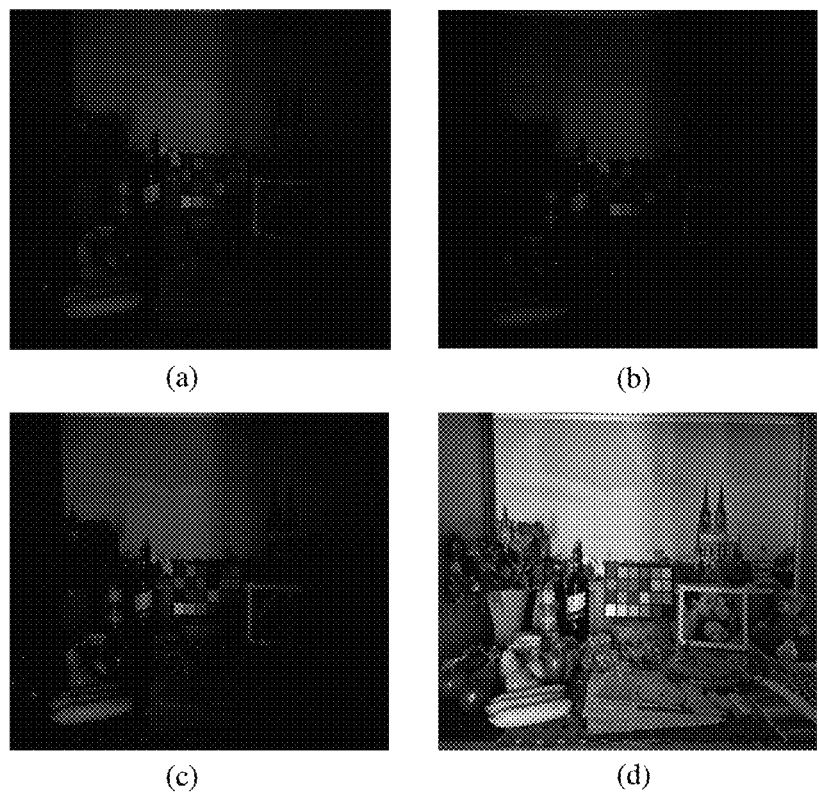
FIG. 16 is a schematic diagram of an image obtained using an image display method according to an embodiment of this application.
Figure 17:
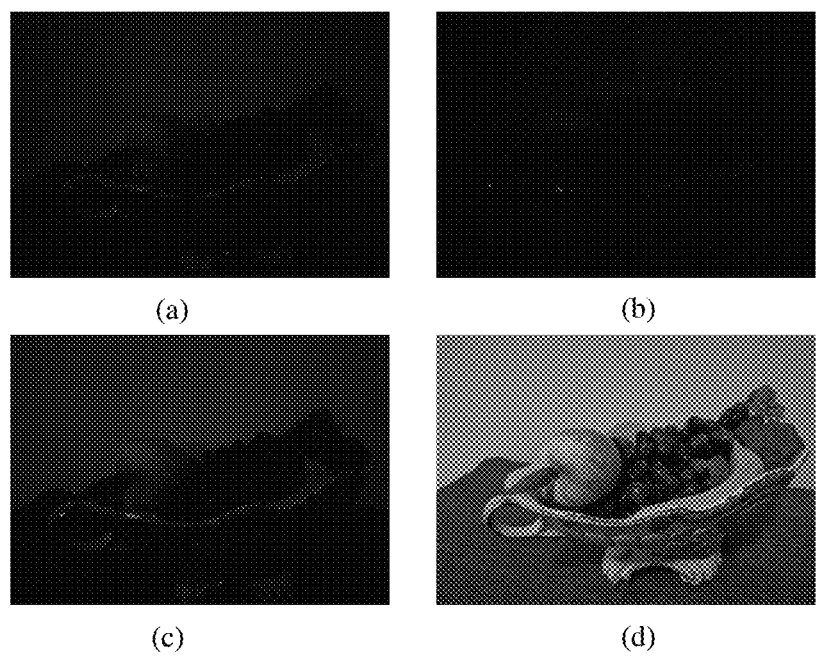
FIG. 17 is a schematic diagram of an image obtained using an image display method according to an embodiment of this application.

FIG. 16 and FIG. 17 are schematic diagrams of images obtained by photographing a same scene according to the image display method in this embodiment of this application and an image display method in the conventional technology. As shown in FIG. 16, in a same photographing scenario, for example, in a photographing scenario with illumination less than 0.3 lux, FIG. 16(d) shows the image obtained according to the image display method in this embodiment of this application. It should be noted that FIG. 16(a) to FIG. 16(d) are color images. It can be seen from FIG. 16 that image quality of FIG. 16(d) is better than those of other images. For example, a color, luminance, a detail, noise, and the like of the image in FIG. 16(d) are better than those of the other images. Similarly, as shown in FIG. 17, in a same photographing scenario, for example, in a photographing scenario with illumination less than 0.3 lux, FIG. 17(d) shows an image obtained according to the image display method in this embodiment of this application. It can be seen from FIG. 17 that image quality of FIG. 17(d) is better than those of other images. For example, a color, luminance, a detail, noise, and the like of the image in FIG. 17(d) are better than those of the other images. It should be noted that FIG. 17(a) to FIG. 17(d) are color images.

In this application, the first operation of turning on the camera by the user is detected, the second operation of indicating the camera by the user is detected, and the second image is displayed in the viewfinder frame of the display screen in response to the second operation, where the second image is the image obtained by processing the N frames of raw images captured by the camera. Because the raw image is an image that is not processed by an ISP or according to an algorithm of an accelerator, a form of noise in the raw image is not damaged. In this application, denoising processing is performed by obtaining the N frames of raw images, to improve an image denoising effect in a low-illumination environment.

It should be understood that the foregoing example descriptions are intended to help a person skilled in the art understand the embodiments of this application, but are not intended to limit the embodiments of this application to a specific value or a specific scenario in the examples. It is clear that a person skilled in the art can make various equivalent modifications or changes according to the examples described above, and such modifications or changes also fall within the scope of the embodiments of this application.

The foregoing describes a neural network pre-training method and the image display method provided in the embodiments of this application in detail with reference to FIG. 1 to FIG. 17. The following describes apparatus embodiments of this application in detail with reference to FIG. 18 to FIG. 19. It should be understood that an image display display in the embodiments of this application may perform the methods in the foregoing embodiments of this application. To be specific, for specific working processes of the following various products, refer to corresponding processes in the foregoing method embodiments.

Figure 18:
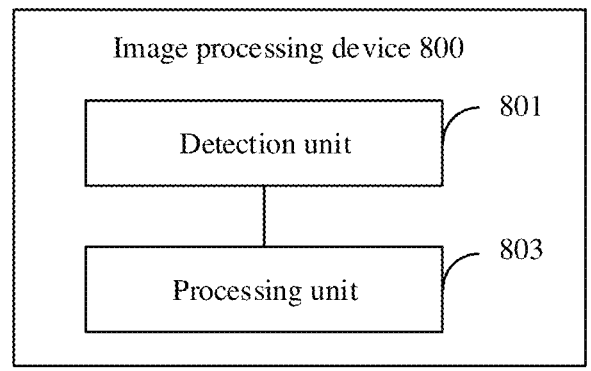
FIG. 18 is a schematic diagram of a structure of an image display device according to an embodiment of this application.

FIG. 18 is a schematic block diagram of an image display device 800 according to an embodiment of this application. It should be understood that the device 800 can perform the steps in the methods in FIG. 4 to FIG. 17. The device 800 includes a detection unit 801 and a processing unit 803.

The detection unit 801 is configured to detect a first operation of turning on a camera by a user. The processing unit 803 is configured to display a photographing interface on a display screen in response to the first operation, where the photographing interface includes a viewfinder frame, and the viewfinder frame includes a first image. The detection unit 801 is further configured to detect a second operation of indicating the camera by the user. The processing unit 803 is further configured to display a second image in the viewfinder frame in response to the second operation, where the second image is an image obtained by processing N frames of raw images captured by the camera. A neural network model is applied to a processing process. The neural network model uses an image whose noise is lower than a target threshold as an output objective. N is an integer greater than or equal to 2.

Optionally, in an example implementation, the second image is a YUV image output by the neural network model.

Optionally, in another possible implementation, the second image is a YUV image, and the YUV image is a YUV image obtained by post-processing a raw image output by the neural network model.

Optionally, in another possible implementation, the second image is a raw image output by the neural network model.

Optionally, in an example implementation, the neural network model uses the raw image whose noise is lower than the target threshold as the output objective.

It should be noted that the raw image is different from the YUV image. The raw image is raw data obtained by converting a captured light source signal into a digital signal by a sensor. The YUV image is an image obtained by post-processing a raw image. The post-processing may convert the raw image into the YUV image, for example, through processing by an accelerator and an ISP.

It should be further understood that the first image is a preview image in a very low-illumination scenario. For example, the first image may be a preview image of a night scenario, and more specifically, may be a preview image in a scenario with illumination less than 0.3 lux. The first image and the second image have same or substantially same display content. Image quality of the second image is better than that of the first image. For example, a color, luminance, a detail, and noise in the second image are better than those in the first image.

Optionally, in an embodiment, the detection unit 801 is specifically configured to detect a second operation of indicating the first processing mode by the user, or detect a second operation of indicating to photograph by the user, where the second operation is an operation used to indicate to photograph in low illumination.

For example, the first processing mode may be a professional shooting mode, a night shooting mode, or another mode. For example, the second operation of selecting the professional shooting mode or the night shooting mode by the user may be detected. In response to the second operation of selecting the professional shooting mode or the night shooting mode by the user, the electronic device configures a photosensitivity ISO value of the sensor to be within a target range, for example, sets the ISO value of the sensor of the electronic device to be greater than 12800.

For example, when the electronic device invokes the sensor and detects the low-illumination scenario, for example, a scenario with illumination less than 0.3 lux, the second operation may be indicating to photograph by the user. The second operation of indicating to photograph may be pressing a photographing button in the electronic device by the user, may be indicating, through voice, the electronic device to photograph by the user equipment, or may further include another action of indicating the electronic device to photograph by the user.

Further, when the electronic device invokes the sensor and detects that the electronic device is currently in the scenario with illumination less than 0.3 lux, the electronic device may configure the photosensitivity ISO value of the sensor to be within the target range.

For example, the target range may be that the ISO value is greater than 6400, or the ISO value is greater than 12800. This application is not limited thereto.

Optionally, in an embodiment, the processing unit 803 is specifically configured to:

separate color channels in each frame of image in the image set to obtain a channel image corresponding to each frame of image, where the image set includes the m frames of registered images and the reference frame image, and the channel image includes a first channel image, a second channel image, and a third channel image;

process, by using the neural network model, a channel image set corresponding to the image set, to obtain associated data, where the associated data includes one or more of associated information between images, associated information between different channels in an image, and associated information between channels in different images;

obtain a target channel image of each frame of image based on the associated data, where the target channel image includes a noise image of a first channel, a noise image of a second channel, and a noise image of a third channel; and combine channels in the target channel image to obtain the denoised output image.

For example, the processing unit 803 is specifically configured to preprocess the image set to obtain the channel image corresponding to each frame of image. The preprocessing includes: separating color channels, where the image set includes the m frames of registered images and the reference frame image, and the channel image includes the first channel image, the second channel image, and the third channel image; inputting the channel image corresponding to each frame of image in the image set to the neural network model as input data, to obtain the target channel image as output data of the neural network model, where the target channel image includes the noise image of the first channel, the noise image of the second channel, and the noise image of the third channel; and post-processing the target channel image to obtain the denoised output image, where the post-processing includes channel combination processing, DRC processing, AWB processing, and ISP processing.

It should be understood that, in an example implementation, either of the preprocessing and post-processing processes may be performed in the neural network model. Alternatively, in another example implementation, either of the preprocessing and post-processing processes may not be performed in the neural network model.

Optionally, in an embodiment, the first channel image, the second channel image, and the third channel image include an R channel image, a Y channel image, and a B channel image, where the Y channel image includes a Yb channel image and a Yr channel image.

Optionally, in an embodiment, the first channel image, the second channel image, and the third channel image include an R channel image, a G channel image, and a B channel image, where the G channel image includes a Gb channel image and a Gr channel image.

Optionally, in an embodiment, the processing unit 803 is specifically configured to:

separate color channels in each frame of image in the image set to obtain a channel image corresponding to each frame of image, where the channel image includes a first channel image, a second channel image, and a third channel image;

process, by using the neural network model, a channel image set corresponding to the image set, to obtain associated data, where the associated data includes one or more of associated information between images, associated information between different channels in an image, and associated information between channels in different images;

obtain a first target channel image of each frame of image based on the associated data, where the first target channel image includes a noise image of a first channel, a noise image of a second channel, and a noise image of a third channel;

fuse image features of the m frames of registered images and calculate an average value, to obtain an average image;

separate color channels in the average image to obtain a channel average image, where the channel average image includes an average image of the first channel, an average image of the second channel, and an average image of the third channel;

superimpose features of the channel average image and the corresponding first target channel image to obtain a second target channel image; and combine channels in the second target channel image to obtain the denoised output image.

Optionally, in an embodiment, the N frames of raw images are Bayer format images.

Optionally, in an embodiment, the processing unit 803 is specifically configured to: perform dynamic range compression DRC processing on the output image to obtain a highly dynamic feature image; perform white balance AWB processing on the highly dynamic feature image to obtain a color corrected image; and perform image signal processing on the color corrected image to obtain the second image.

For example, the output image output by the neural network model is a raw image, and the raw image is post-processed inside the electronic device. For example, post-processing the output raw image may include DRC processing, AWB processing, and image signal processing, to obtain the second image. The second image is the YUV image. In other words, the output raw image is post-processed to obtain the YUV image.

Optionally, in an embodiment, the processing unit 803 is specifically configured to:

perform registration processing on each of m frames of to-be-processed images based on the reference frame image by using an optical flow method, to obtain the m frames of registered images.

It should be understood that the image display device 800 herein is presented in a form of a functional unit. The term "unit" herein may be implemented in a form of software and/or hardware. This is not specifically limited. For example, the "unit" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) and a memory that are configured to execute one or more software or firmware programs, a merged logic circuit, and/or another suitable component that supports the described functions.

Therefore, the units in the examples described in the embodiments of this application can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

An embodiment of this application further provides an electronic device. The electronic device may be a terminal device, or may be a circuit device built into the terminal device. The device may be configured to perform the functions/steps in the foregoing method embodiments.

Figure 19:
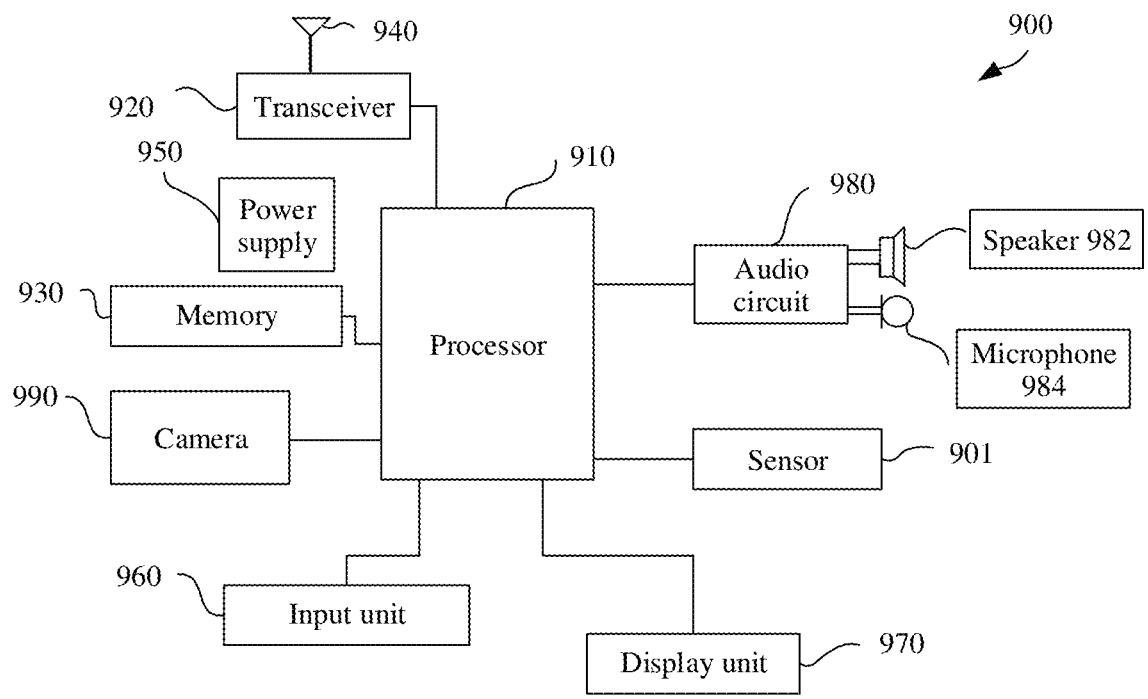
FIG. 19 is a schematic diagram of a structure of an image display device according to an embodiment of this application.

As shown in FIG. 19, the electronic device 900 includes a processor 910 and a transceiver 920. Optionally, the electronic device 900 may further include a memory 930. The processor 910, the transceiver 920, and the memory 930 may communicate with each other through an internal connection path to transfer a control signal and/or a data signal. The memory 930 is configured to store a computer program. The processor 910 is configured to invoke and run the computer program in the memory 930.

Optionally, the electronic device 900 may further include an antenna 940, configured to send a wireless signal output by the transceiver 920.

The processor 910 and the memory 930 may be integrated into one processing apparatus, or more commonly, components independent of each other. The processor 910 is configured to execute program code stored in the memory 930 to implement the foregoing functions. In a specific implementation, the memory 930 may also be integrated into the processor 910, or may be independent of the processor 910. The processor 910 may correspond to the processing unit 803 in the device 800 in FIG. 18.

In addition, to improve the functions of the electronic device 900, the electronic device 900 may further include one or more of an input unit 960, a display unit 970, an audio circuit 980, a camera 990, a sensor 901, and the like. The audio circuit may further include a speaker 982, a microphone 984, and the like. The display unit 970 may include a display screen, and the display unit 970 may correspond to the detection unit 801 in the device 800 in FIG. 18.

Optionally, the electronic device 900 may further include a power supply 950, configured to supply power to various devices or circuits in the terminal device.

It should be understood that the electronic device 900 shown in FIG. 19 can implement processes in the method embodiments shown in FIG. 4 to FIG. 17. Operations and/or functions of the modules in the electronic device 900 are separately intended to implement corresponding procedures in the foregoing method embodiments. For details, refer to the descriptions in the foregoing method embodiments. To avoid repetition, detailed descriptions are omitted herein.

It should be understood that the processor 910 in the electronic device 900 shown in FIG. 19 may be a system on a chip (SOC). The processor 910 may include a central processing unit (CPU) and a neural network processing unit (NPU) 30 shown in FIG. 3. The processor 910 may further include another type of processor. The CPU may be referred to as a host CPU. The neural network processing unit NPU 30 is mounted to the host CPU (Host CPU) as a coprocessor, and the host CPU assigns a task. The processors work together to implement the foregoing method procedure, and each processor may selectively execute a part of software drivers.

For example, 410 to 430 in FIG. 4 may be performed by the CPU, or may be performed by a DSP. 440 may be performed by the NPU or a GPU 30.

Some processors or processing units in the processor 910 may work together to implement the foregoing method procedure, and software programs corresponding to the processors or processing units may be stored in the memory 930. The NPU 30 is merely used as an example. An actual neural network function may be performed by a processing device other than the NPU 30. For example, a graphics processing unit (GPU) may also be used for neural network processing. This is not limited in this embodiment.

This application further provides a computer-readable storage medium. The computer-readable storage medium stores instructions. When the instructions are run on a computer, the computer is enabled to perform the steps in the image display method shown in FIG. 4 or FIG. 9.

This application further provides a computer program product including instructions. When the computer program product runs on a computer or at least one processor, the computer is enabled to perform the steps in the image display method shown in FIG. 4 or FIG. 9.

This application further provides a chip, including a processor. The processor is configured to read a computer program stored in a memory and run the computer program, to perform a corresponding operation and/or procedure in the image display method provided in this application.

Optionally, the chip further includes a memory. The memory and the processor are connected to the memory by using a circuit or a wire. The processor is configured to read and execute a computer program in the memory. Further, optionally, the chip includes a communications interface. The processor is connected to the communications interface. The communications interface is configured to receive data and/or information that need/needs to be processed. The processor obtains the data and/or the information from the communications interface, and processes the data and/or the information. The communications interface may be an input/output interface.

In the foregoing embodiments, the processor 910 may include, for example, a central processing unit (CPU), a microprocessor, a microcontroller, or a digital signal processor, and may further include a GPU, an NPU, and an ISP. The processor may further include a necessary hardware accelerator or a logic processing hardware circuit, for example, an application-specific integrated circuit (ASIC), or one or more integrated circuits configured to control programs to perform the technical solutions in this application. In addition, the processor may have a function of operating one or more software programs. The software programs may be stored in the memory.

The memory may be a read-only memory (ROM), another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage medium, an optical disc storage medium (including a compact optical disc, a laser disc, an optical disc, a digital versatile optical disc, a Blu-ray disc, and the like), a magnetic disk storage medium or another magnetic storage device, any other medium that can be used to carry or store expected program code in a form of instructions or a data structure and that can be accessed by a computer, or the like.

In the embodiments of this application, the term "at least one" means one or more, and the term "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural. The character "/" generally indicates an "or" relationship between the associated objects. The term "at least one item of the following" or a similar expression thereof means any combination of the items, including any combination of singular items or plural items. For example, at least one of a, b, and c may indicate a, b, c, a and b, a and c, b and c, or a, b, and c, where a, b, and c may be singular or plural.

A person of ordinary skill in the art may be aware that units, algorithms, and steps described in the embodiments disclosed in this specification can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

In the embodiments of this application, when any of the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for indicating a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (random access memory, RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. An image display method, performed by an electronic device having a display screen and a camera, comprising:
    detecting a first operation of enabling a camera function by a user;
    displaying a photographing interface on the display screen in response to the first operation, wherein the photographing interface comprises a viewfinder frame, and the viewfinder frame comprises a first image;
    detecting a second operation of the camera function indicated by the user; and
    displaying a second image in the viewfinder frame in response to the second operation, wherein the second image is based on a denoised output image obtained by processing N frames of raw images captured by the camera, wherein a neural network model is applied to the processing, the neural network model is a pre-trained neural network which has the N frames of raw images captured by the camera as an input, and has the denoised output image whose noise is lower than a target threshold as an output, and wherein N is an integer greater than or equal to 2.

2. The method according to claim 1, wherein the first image is a preview image in a scenario with illumination less than 0.3 lux.

3. The method according to claim 1, wherein the detecting a second operation of the camera indicated by the user comprises:
   detecting a second operation of indicating a first processing mode by the user; or
   detecting a second operation of indicating to photograph by the user, wherein the second operation is an operation used to indicate to photograph in low illumination.

4. The method according to claim 1, wherein the N frames of raw images comprise a reference frame image and m frames of to-be-processed images, and the processing process comprises:
   performing registration processing on the m frames of to-be-processed images based on the reference frame image, to obtain m frames of registered images; and
   obtaining, based on an image set and the neural network model, the denoised output image; wherein
   the image set comprises the m frames of registered images and the reference frame image and the denoised output image is the second image, or the second image is an image obtained by performing post-processing on the denoised output image.

5. An image display method, applied to an electronic device having a camera, comprising:
   detecting that the electronic device is in a very low-illumination scenario, wherein the very low-illumination scenario comprises a scenario with illumination less than 0.3 lux; and
   processing, by using a neural network model, N frames of raw images captured by the camera, to obtain a denoised output image, wherein the neural network model is a pretrained neural network which has the N frames of raw images captured by the camera as an input, and has the denoised output image whose noise is lower than a target threshold as an output, and wherein N is an integer greater than or equal to 2.

6. The method according to claim 5, wherein the N frames of raw images comprise a reference frame image and m frames of to-be-processed images, and the processing, by using a neural network model, N frames of raw images captured by the camera, to obtain a denoised output image comprises:
   performing registration processing on the m frames of to-be-processed images based on the reference frame image, to obtain m frames of registered images; and
   obtaining, based on an image set and the neural network model, the denoised output image; wherein
   the image set comprises the m frames of registered images and the reference frame image.

7. An image display device, comprising:
   a display screen, a camera, one or more processors, a memory, a plurality of application programs, and one or more computer programs, wherein the one or more computer programs are stored in the memory, the one or more computer programs comprise instructions, and when the instructions are executed by the device, the device is configured to perform operations comprising:
   detecting a first operation enabling a camera function;
   displaying a photographing interface on the display screen in response to the first operation, wherein the photographing interface comprises a viewfinder frame, and the viewfinder frame comprises a first image;
   detecting a second operation of the camera function; and
   displaying a second image in the viewfinder frame in response to the second operation, wherein the second image is based on a denoised output image obtained by processing N frames of raw images captured by the camera, wherein a neural network model is applied to the processing, the neural network model is a pretrained neural network which has the N frames of raw images captured by the camera as an input, and has the denoised output image whose noise is lower than a target threshold as an output, and wherein N is an integer greater than or equal to 2.

8. The device according to claim 7, wherein the first image is a preview image in a scenario with illumination less than 0.3 lux.

9. The device according to claim 7, wherein when the instructions are executed by the device, the device is configured to perform:
   detecting a second operation of indicating a first processing mode; or
   detecting a second operation of indicating to photograph, wherein the second operation is an operation used to indicate to photograph in low illumination.

10. The device according to claim 7, wherein the N frames of raw images comprise a reference frame image and m frames of to-be-processed images, and when the instructions are executed by the device, the device is configured to perform:
    registration processing on the m frames of to-be-processed images based on the reference frame image, to obtain m frames of registered images; and
    obtaining, based on an image set and the neural network model, the denoised output image; wherein
    the image set comprises the m frames of registered images and the reference frame image, and the denoised output image is the second image, or the second image is an image obtained by performing post-processing on the denoised output image.

11. The device according to claim 10, wherein when the instructions are executed by the device, the device is configured to perform:
    separating color channels in each frame of image in the image set to obtain a channel image corresponding to each frame of image, wherein the channel image comprises a first channel image, a second channel image, and a third channel image;
    processing, by using the neural network model, a channel image set corresponding to the image set, to obtain associated data, wherein the associated data comprises one or more of associated information between images, associated information between different channels in an image, and associated information between channels in different images;
    obtaining a target channel image of each frame of image based on the associated data, wherein the target channel image comprises a noise image of a first channel, a noise image of a second channel, and a noise image of a third channel; and
    combining channels in the target channel image to obtain the denoised output image.

12. The device according to claim 10, wherein the image set further comprises a ghost image, and the ghost image is obtained from a difference between the m frames of registered images and the reference frame image.

13. The device according to claim 12, wherein when the instructions are executed by the device, the device is configured to perform:

separating color channels in each frame of image in the image set to obtain a channel image corresponding to each frame of image, wherein the channel image comprises a first channel image, a second channel image, and a third channel image;

processing, by using the neural network model, a channel image set corresponding to the image set, to obtain associated data, wherein the associated data comprises one or more of associated information between images, associated information between different channels in an image, and associated information between channels in different images;

obtaining a first target channel image of each frame of image based on the associated data, wherein the first target channel image comprises a noise image of a first channel, a noise image of a second channel, and a noise image of a third channel;

fusing image features of the m frames of registered images and calculate an average value, to obtain an average image;

separating color channels in the average image to obtain a channel average image, wherein the channel average image comprises an average image of the first channel, an average image of the second channel, and an average image of the third channel;

superimposing features of the channel average image and the corresponding first target channel image to obtain a second target channel image; and combining channels in the second target channel image to obtain the denoised output image.

14. The device according to claim 11, wherein the first channel image, the second channel image, and the third channel image comprise an R channel image, a Y channel image, and a B channel image, wherein the Y channel image comprises a Yb channel image and a Yr channel image; or the first channel image, the second channel image, and the third channel image comprise an R channel image, a G channel image, and a B channel image, wherein the G channel image comprises a Gb channel image and a Gr channel image.

15. The device according to claim 7, wherein the N frames of raw images are Bayer format images.

16. The device according to claim 10, wherein when the instructions are executed by the device, the device is configured to perform:

dynamic range compression (DRC) processing on the denoised output image to obtain a highly dynamic feature image;

white balance (AWB) processing on the highly dynamic feature image to obtain a color corrected image; and image signal processing on the color corrected image to obtain the second image.

17. An image display device, comprising:

a camera, one or more processors, a memory, a plurality of application programs, and one or more computer programs, wherein the one or more computer programs are stored in the memory, the one or more computer programs comprise instructions, and when the instructions are executed by the device, the device is configured to perform operations comprising:

detecting that the image display device is in a very low-illumination scenario, wherein the very low-illumination scenario comprises a scenario with illumination less than 0.3 lux; and processing, by using a neural network model, N frames of raw images captured by the camera, to obtain a denoised output image, wherein the neural network model is a pretrained neural network which has the N frames of raw images captured by the camera as an input, and has the denoised output image whose noise is lower than a target threshold as an output, and wherein N is an integer greater than or equal to 2.

18. The device according to claim 17, wherein the N frames of raw images comprise a reference frame image and m frames of to-be-processed images, and when the instructions are executed by the device, the device is configured to perform:

registration processing on the m frames of to-be-processed images based on the reference frame image, to obtain m frames of registered images; and obtaining, based on an image set and the neural network model, the denoised output image; wherein the image set comprises the m frames of registered images and the reference frame image.

19. The device according to claim 18, wherein when the instructions are executed by the device, the device is configured to perform:

separating color channels in each frame of image in the image set to obtain a channel image corresponding to each frame of image, wherein the channel image comprises a first channel image, a second channel image, and a third channel image;

processing, by using the neural network model, a channel image set corresponding to the image set, to obtain associated data, wherein the associated data comprises one or more of associated information between images, associated information between different channels in an image, and associated information between channels in different images;

obtaining a target channel image of each frame of image based on the associated data, wherein the target channel image comprises a noise image of a first channel, a noise image of a second channel, and a noise image of a third channel; and combining channels in the target channel image to obtain the denoised output image.

20. The device according to claim 18, wherein the image set further comprises a ghost image, and the ghost image is obtained from a difference between the m frames of registered images and the reference frame image.

21. The device according to claim 20, wherein when the instructions are executed by the device, the device is configured to perform:

separating color channels in each frame of image in the image set to obtain a channel image corresponding to each frame of image, wherein the channel image comprises a first channel image, a second channel image, and a third channel image;

processing, by using the neural network model, a channel image set corresponding to the image set, to obtain associated data, wherein the associated data comprises one or more of associated information between images, associated information between different channels in an image, and associated information between channels in different images;

obtaining a first target channel image of each frame of image based on the associated data, wherein the first target channel image comprises a noise image of a first channel, a noise image of a second channel, and a noise image of a third channel;

fusing image features of the m frames of registered images and calculate an average value, to obtain an average image;

separating color channels in the average image to obtain a channel average image, wherein the channel average image comprises an average image of the first channel, an average image of the second channel, and an average image of the third channel;

superimposing features of the channel average image and the corresponding first target channel image to obtain a second target channel image; and combining channels in the second target channel image to obtain the denoised output image.

22. The device according to claim 19, wherein the first channel image, the second channel image, and the third channel image comprise an R channel image, a Y channel image, and a B channel image, wherein the Y channel image comprises a Yb channel image and a Yr channel image; or the first channel image, the second channel image, and the third channel image comprise an R channel image, a G channel image, and a B channel image, wherein the G channel image comprises a Gb channel image and a Gr channel image.

23. The device according to claim 17, wherein the N frames of raw images are Bayer format images.

24. The device according to claim 18, wherein when the instructions are executed by the device, the device is configured to perform:

dynamic range compression (DRC) processing on the output image to obtain a highly dynamic feature image;

white balance (AWB) processing on the highly dynamic feature image to obtain a color corrected image; and image signal processing on the color corrected image to obtain an image displayed on a display screen of the image display device.

* * * * *